Sept. 16, 1924.
H. Y. ARMSTRONG
WRAPPING MACHINE
Filed March 10, 1922
1,508,637
12 Sheets-Sheet 1
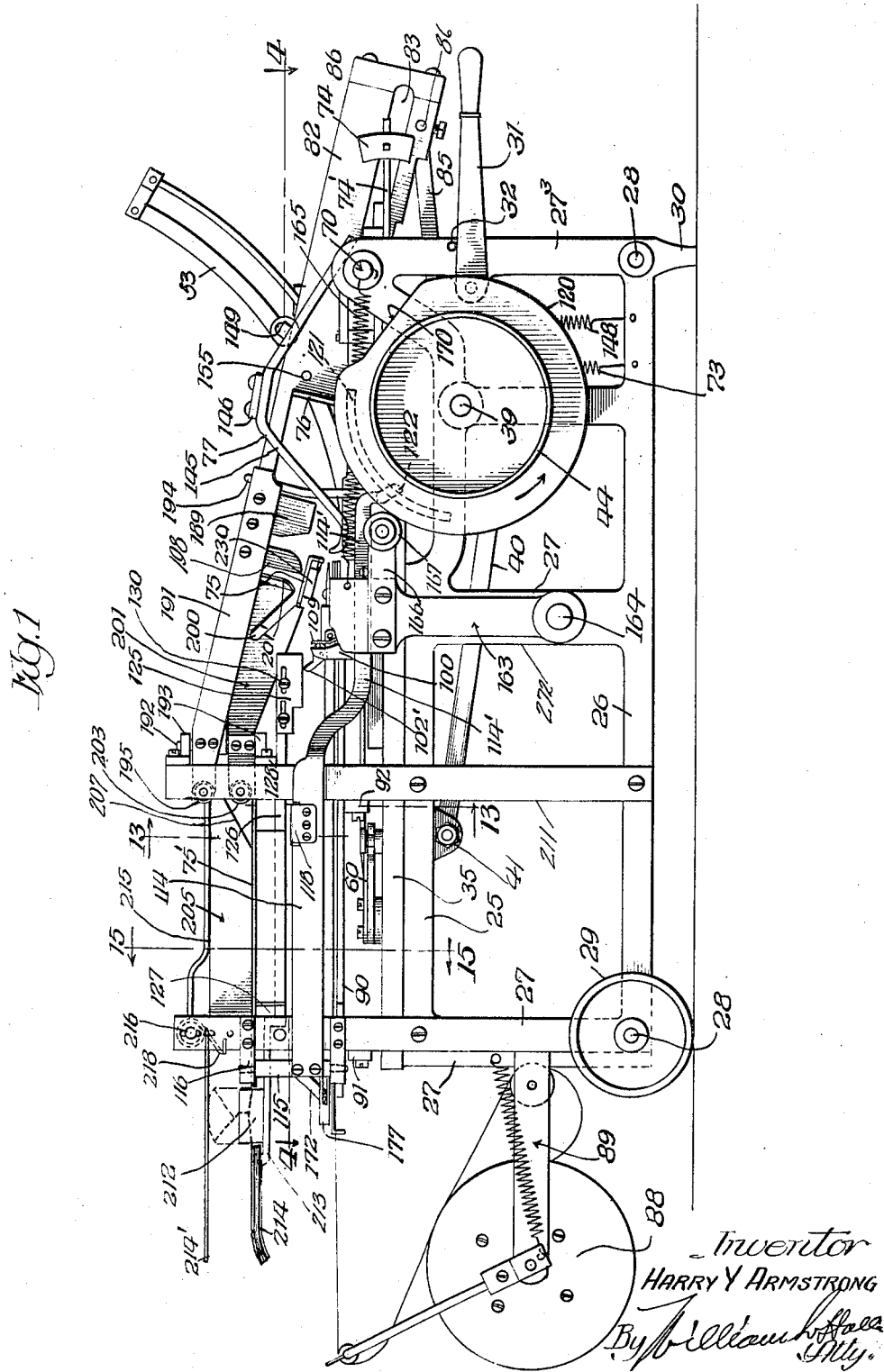
Inventor
HARRY Y ARMSTRONG

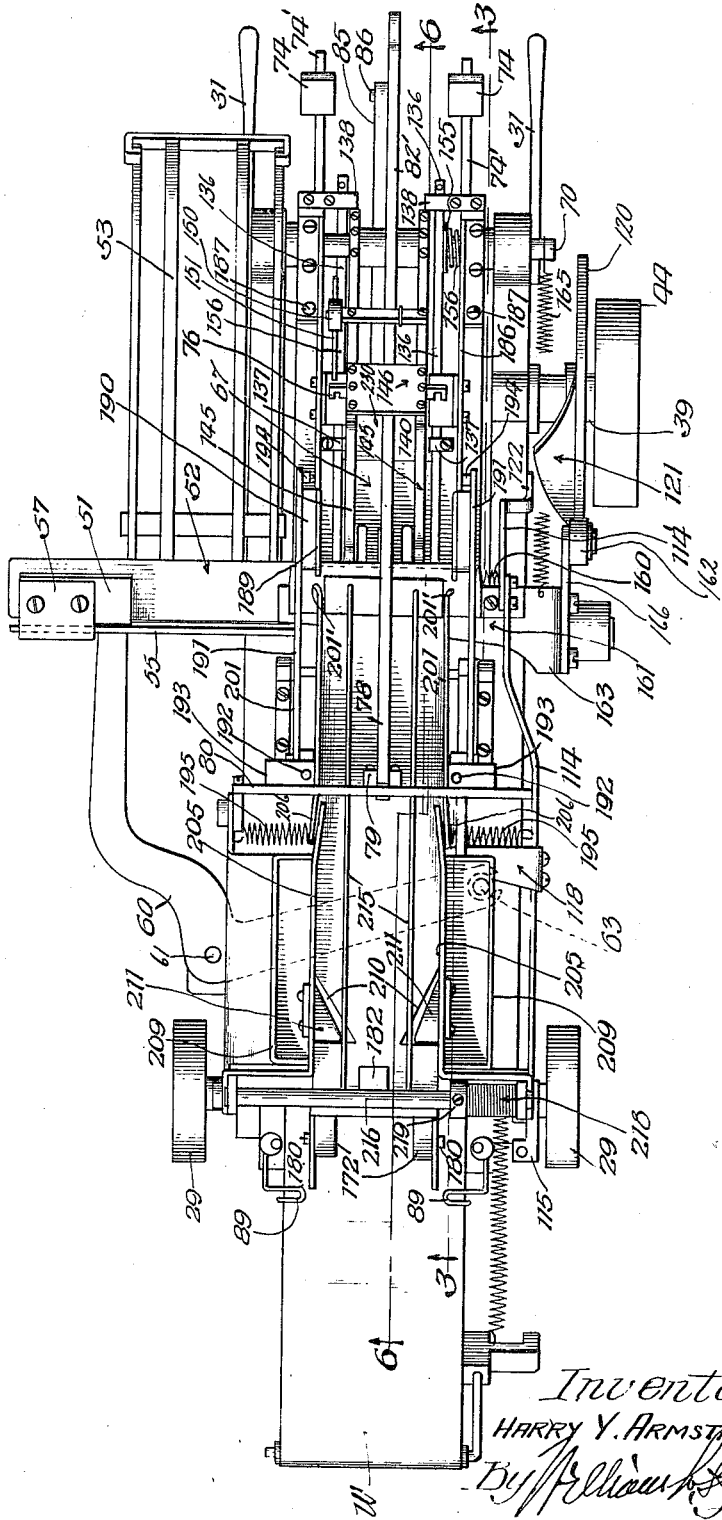

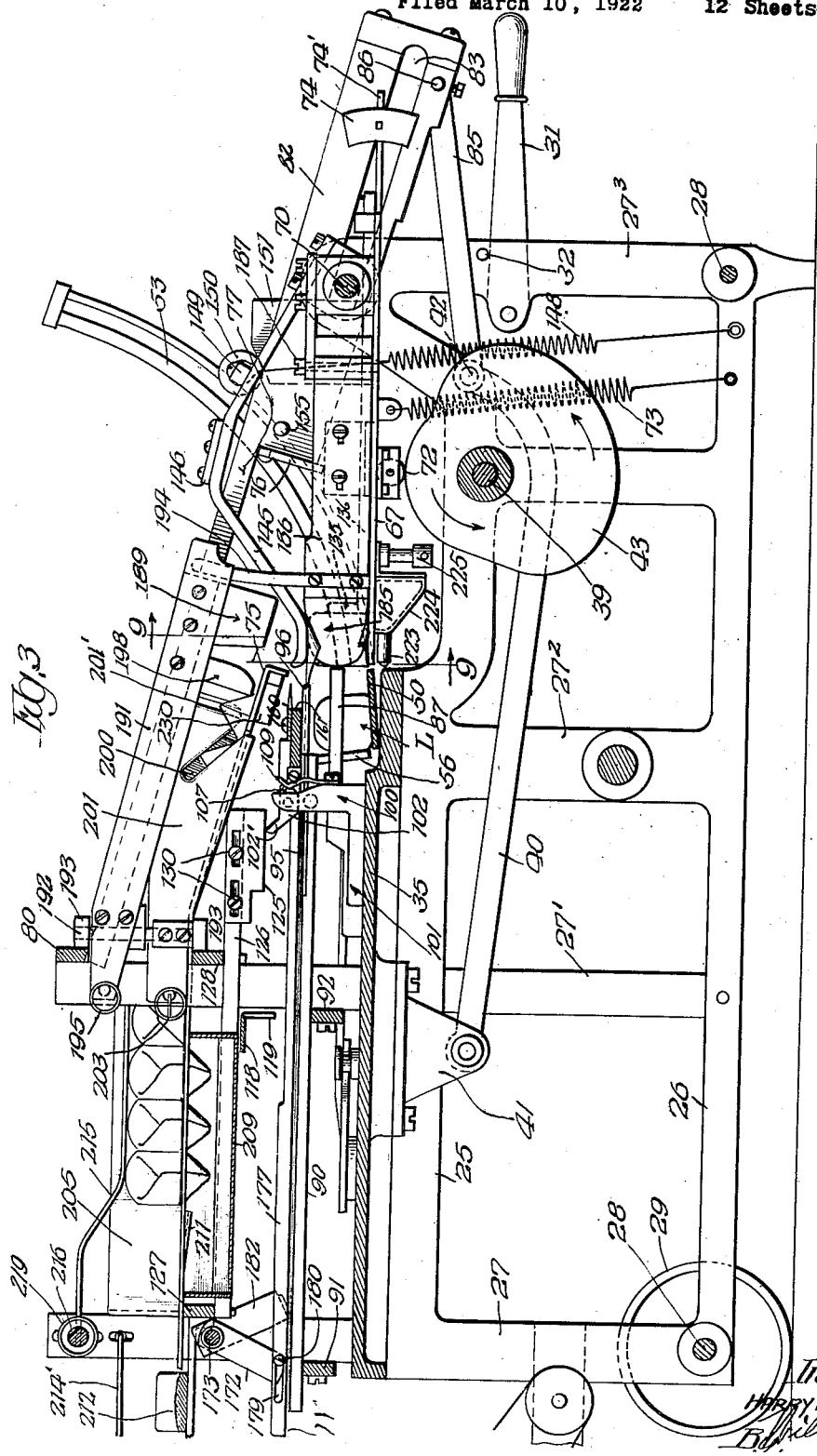

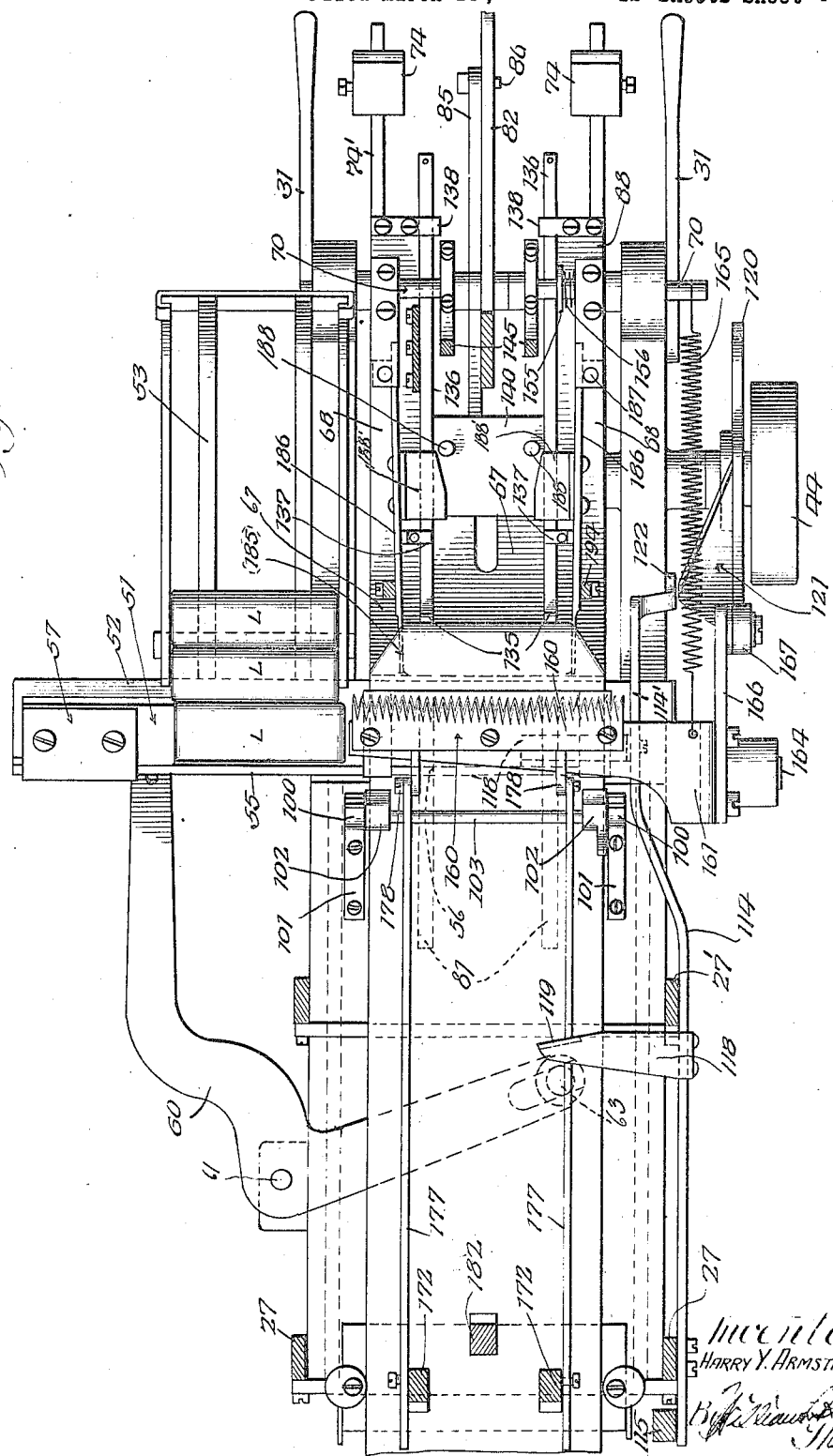

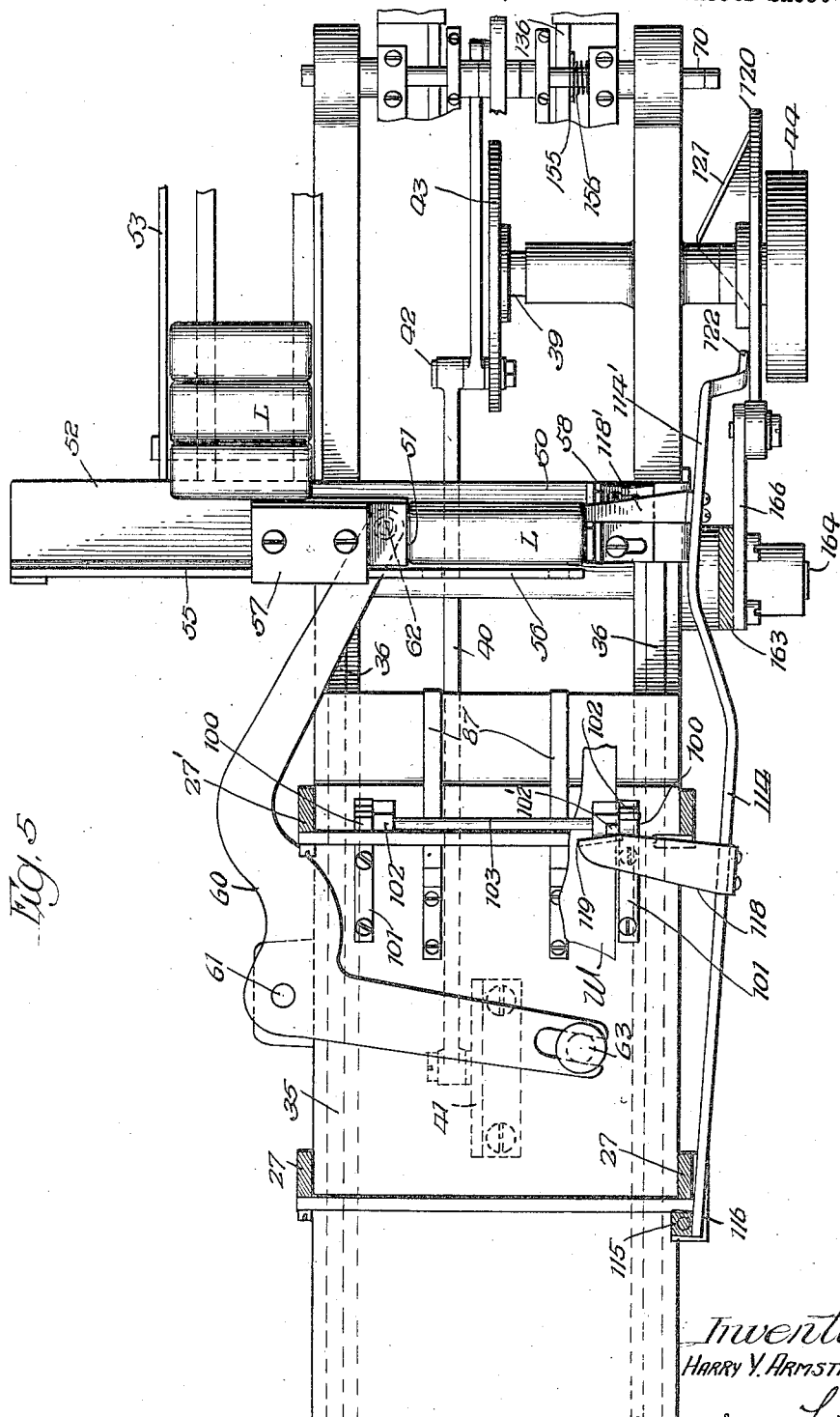

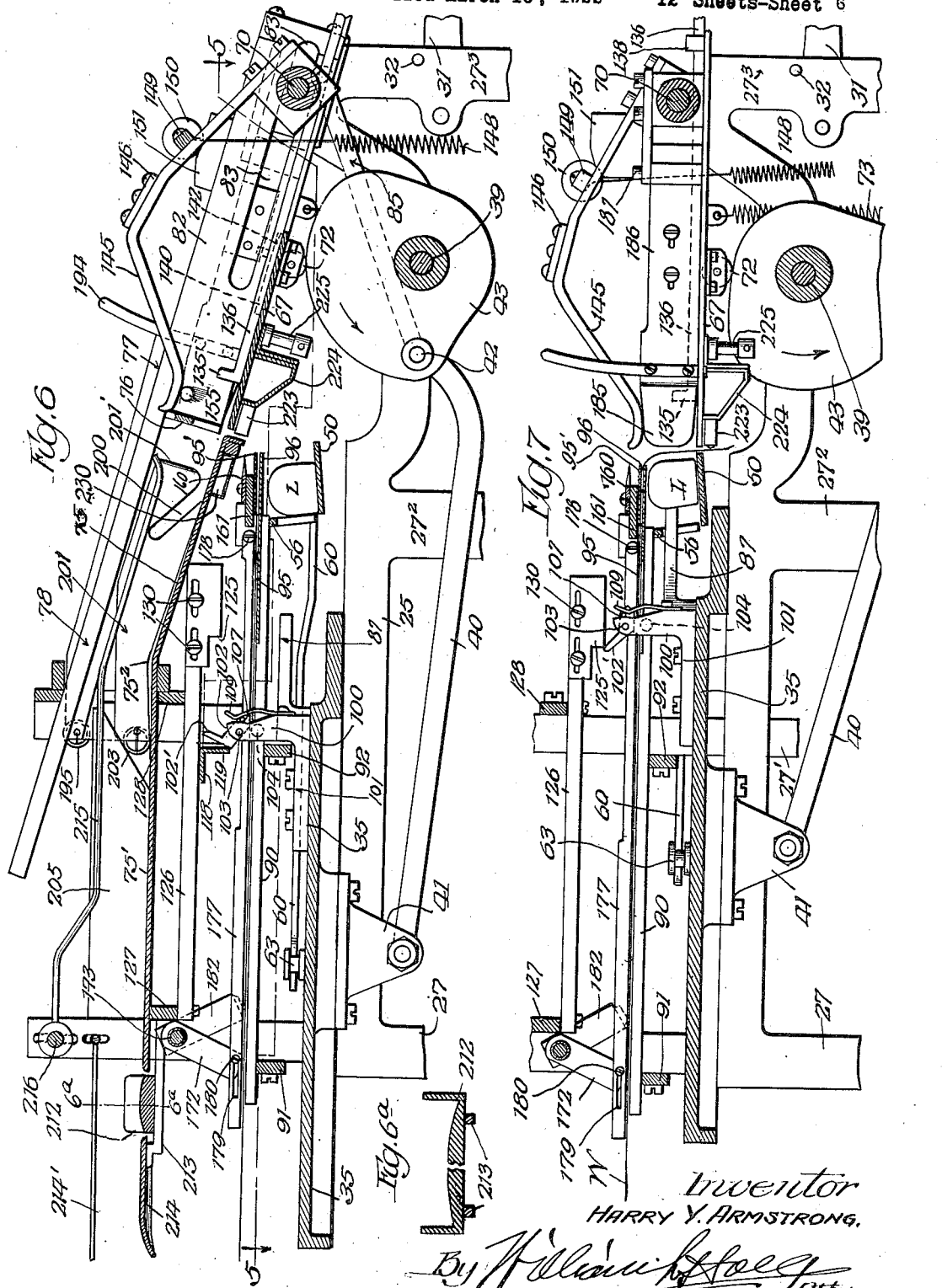

Sept. 16, 1924.  
H. Y. ARMSTRONG  
WRAPPING MACHINE  
Filed March 10, 1922  
1,508,637  
12 Sheets-Sheet 7
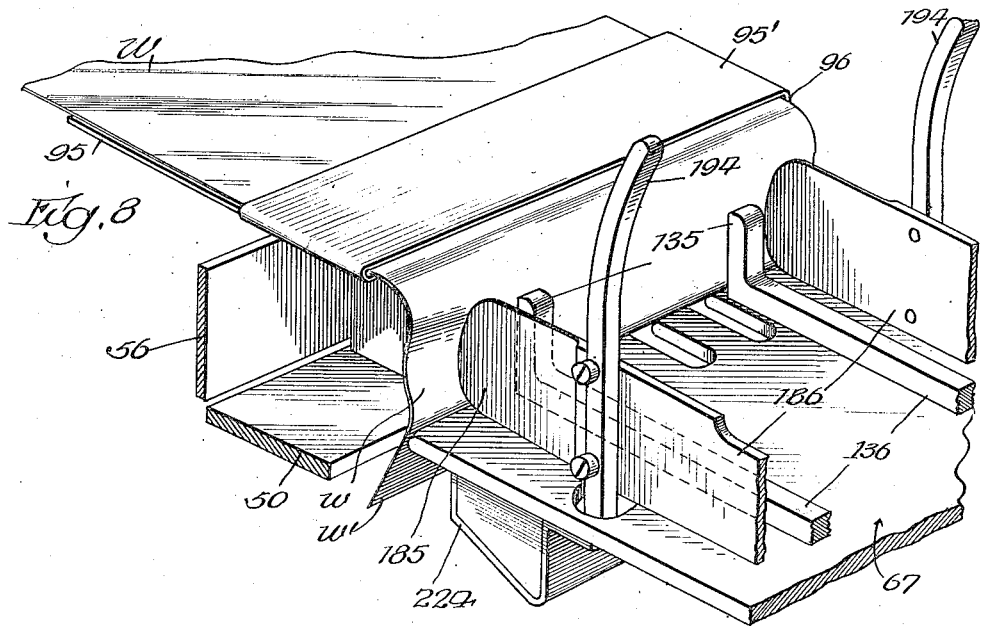
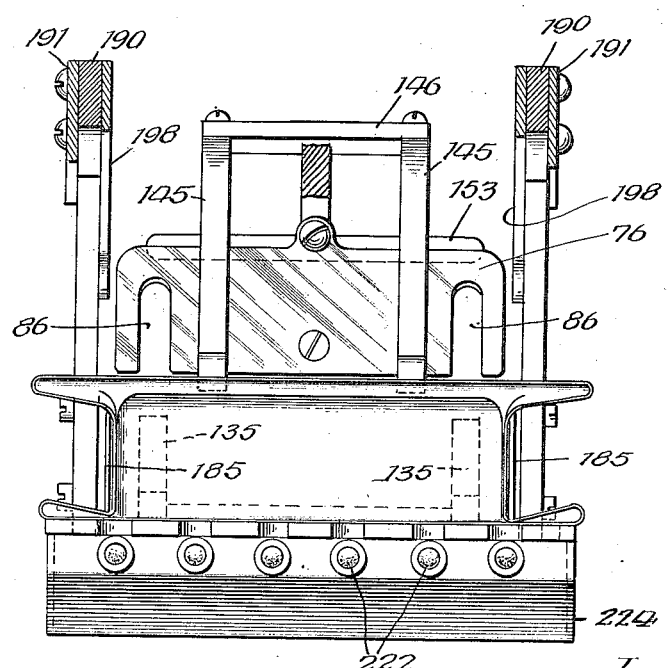
Inventor  
Harry Y. Armstrong  
By William L. Hall  
Atty.

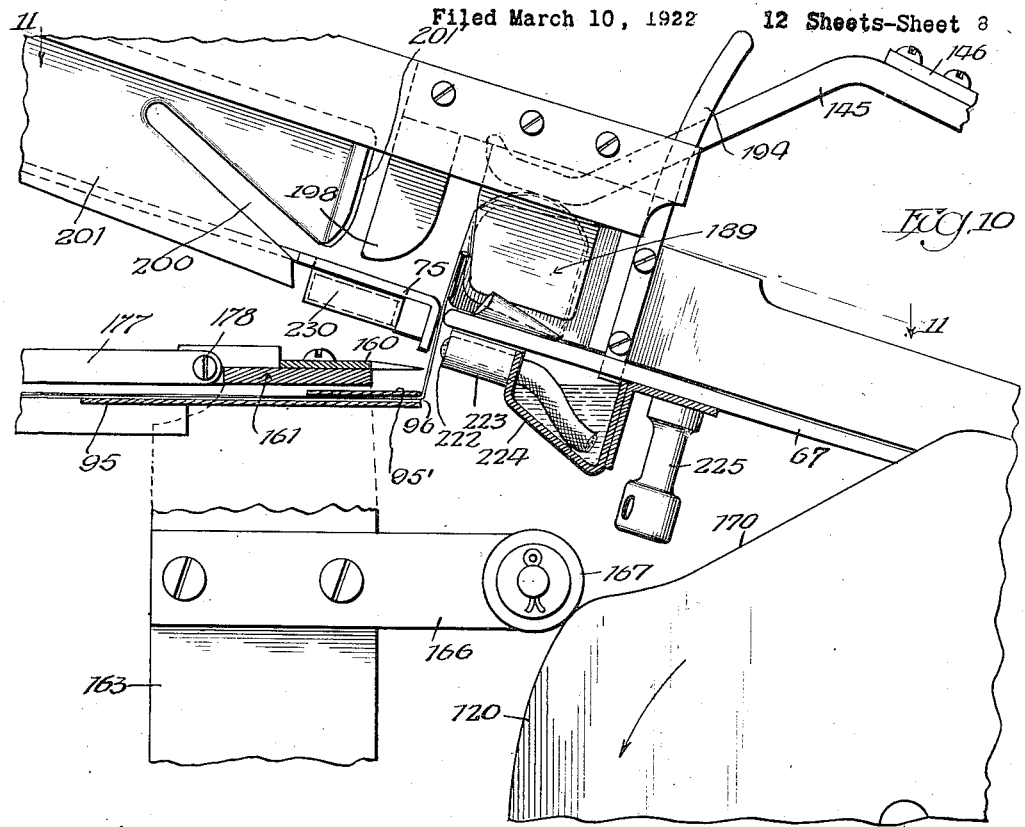
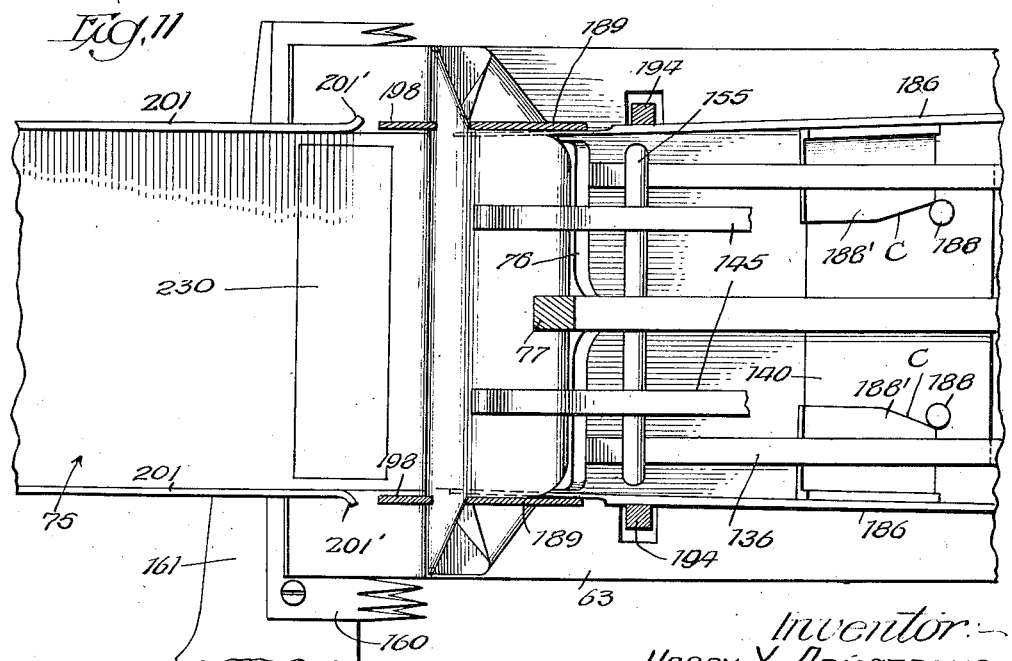

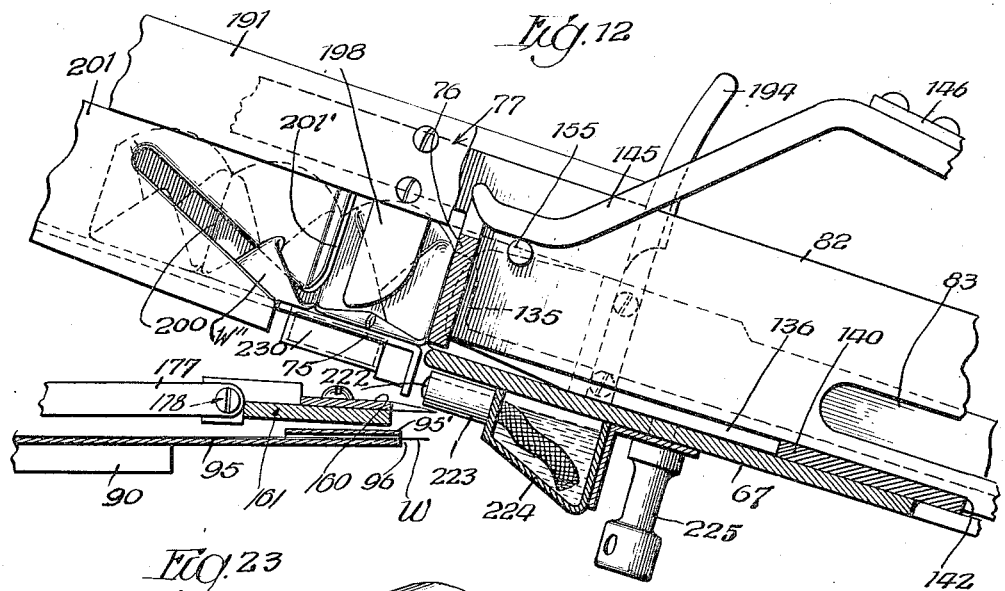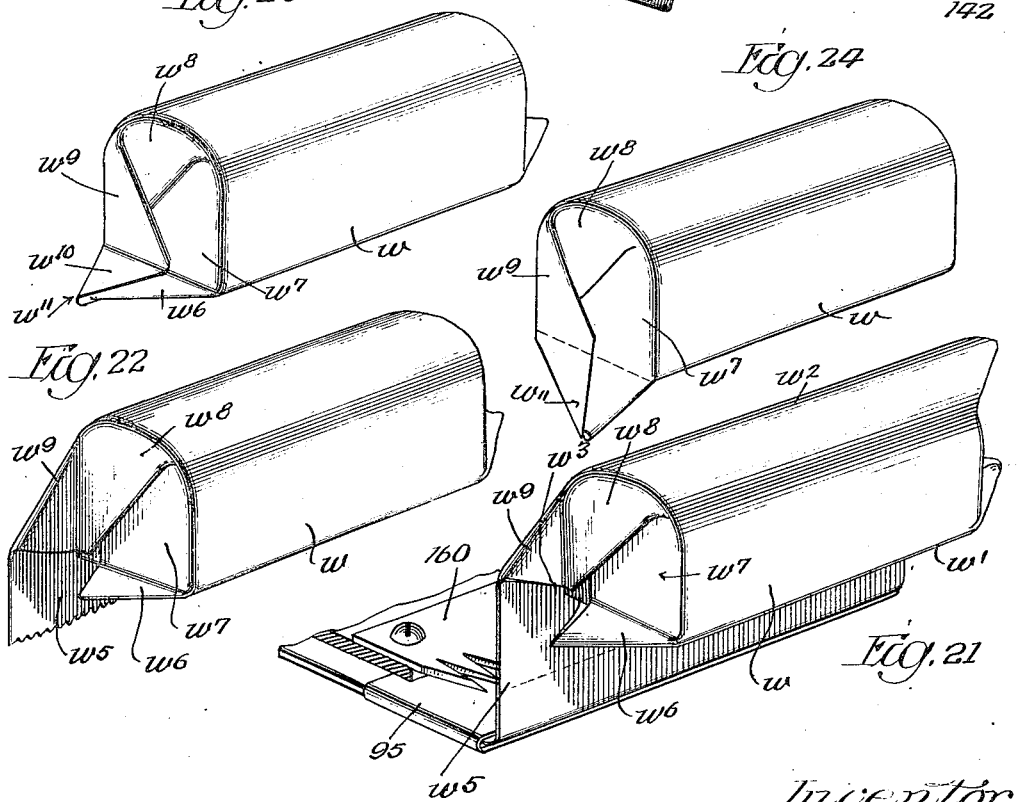

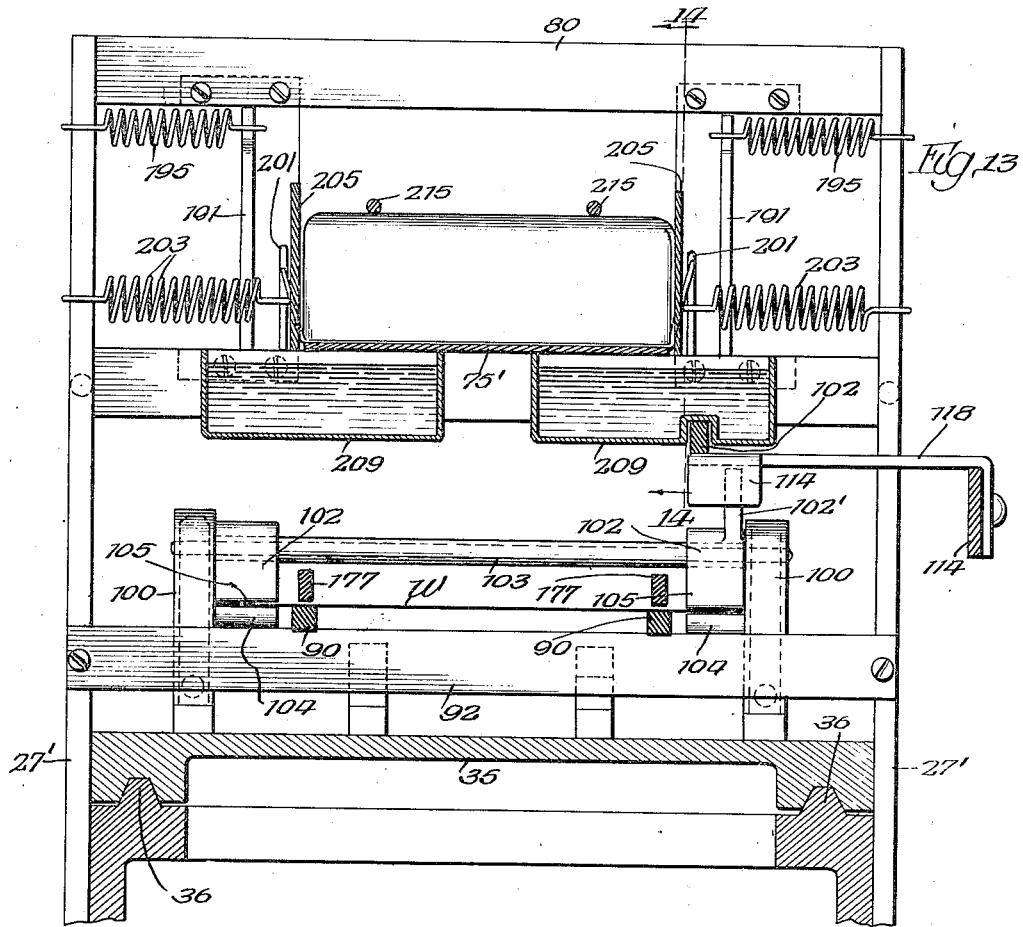
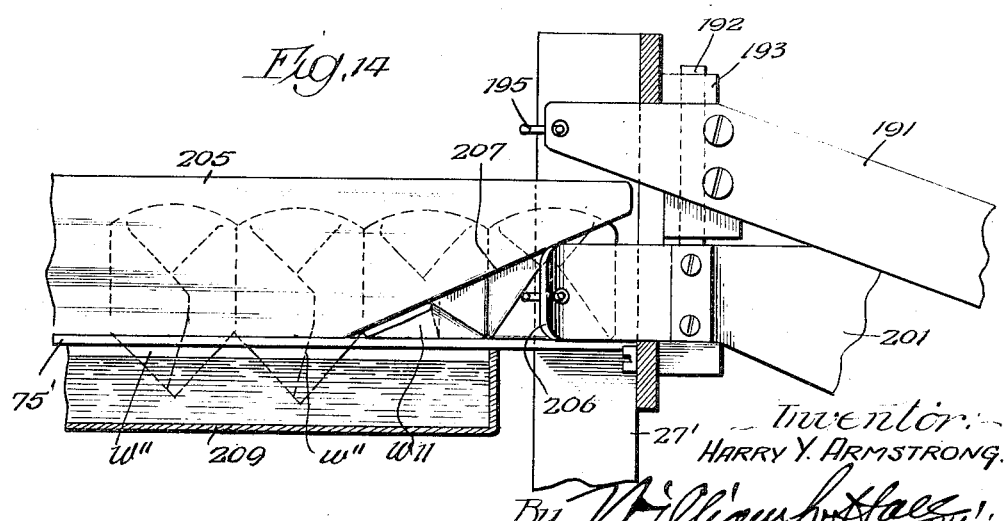

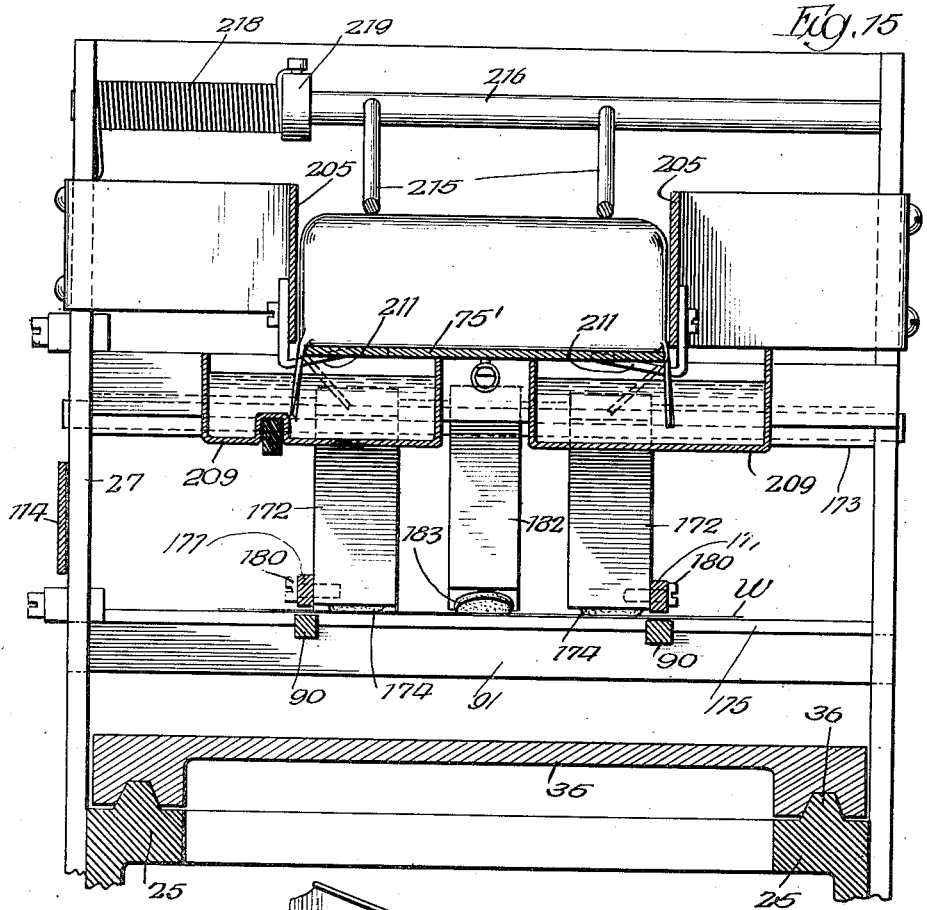
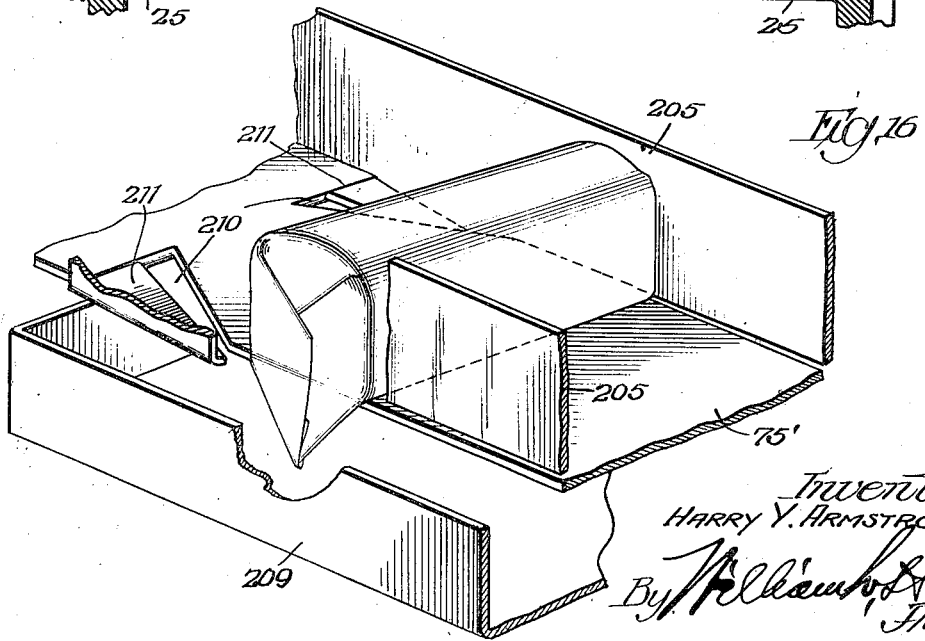

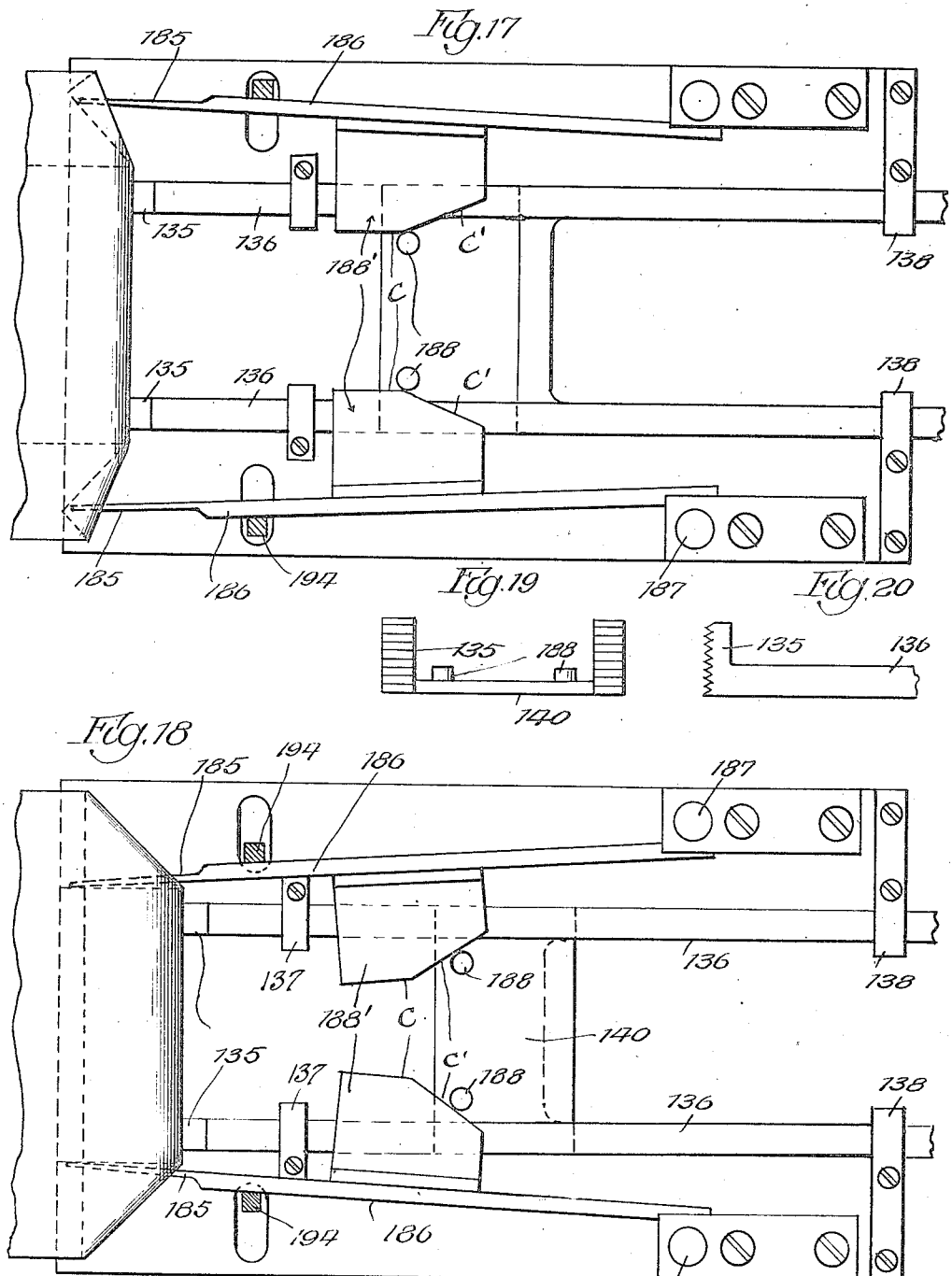

Patented Sept. 16, 1924.

1,508,637

UNITED STATES PATENT OFFICE.

HARRY Y. ARMSTRONG, OF SYRACUSE, NEW YORK, ASSIGNOR OF ONE-HALF TO WILLIAM L. HALL, OF CHICAGO, ILLINOIS.

WRAPPING MACHINE.

Application filed March 10, 1922. Serial No. 542,541.

*To all whom it may concern:*

Be it known that I, HARRY Y. ARMSTRONG, a citizen of the United States, and a resident of Syracuse, in the county of Onondaga and State of New York, have invented certain new and useful Improvements in Wrapping Machines; and I do hereby declare that the following is a full, clear, and exact description thereof, reference being had to the accompanying drawings, and to the characters of reference marked thereon, which form a part of this specification.

This invention relates to improvements in wrapping machines for enclosing and folding wrappers about articles and for sealing the wrapper thereabout.

A general purpose of the invention is to produce an improved folding mechanism and wrapper feed mechanism so arranged that the article may be efficiently wrapped with a minimum amount of wrapping material, and the wrapper applied with uniform tension about articles of different dimensions without waste of wrapping material and to produce uniformly attractive packages.

In this respect the wrapper folding and wrapper feeding mechanisms are so constructed and so coact with each other that the free, unattached end, of a wrapper web is caused to hang or to be draped freely in the path of an article to be wrapped, so that in the continuous wrapping operations successive free ends of the wrapper web are thus positioned in respect of, or assembled with, the article, and means, constituting parts of the folding and feed mechanisms, cooperate with the articles to cause the latter to seize on and to be wrapped within the web ends while the wrapper sections remain parts of the web, the wrapper sections being cut from the web as the wrapping is completed.

Another object of the invention is to produce novel cooperating wrapping and web-cutting mechanisms for use in such a machine so arranged that during the movements of the article within the free end of the wrapper web, said web is caused to be drawn forwardly and to be tightly measured about the sides of articles of varying contours and circumferential dimensions, and so held when the web is severed to prevent the web from slackening on the article, resulting in a substantial saving of the wrapping material.

Another object of the invention is to produce a novel side wrapping mechanism and wrapper web feed mechanism constructed to initially positively feed the free end of a wrapper web in assembled relation to a deposited article and to press the wrapper on the article during the subsequent movements of the article through the wrapping mechanism so that the wrapper web will be automatically drawn from the source of wrapper supply onto the article by such subsequent movements thereof to an extent only as required by the cross sectional dimensions of the article, and to cut the wrapper web when a sufficient length thereof has been so drawn to be wrapped about the article.

Another object of the invention is to provide a novel means of positioning or assembling the free, unattached end of the wrapper web across the path of the article and of a length to cover the front, an adjacent side and part of the bottom of the article and to circumferentially or sidefold the article within said free end and to finally sever the wrapper section in which the article is so wrapped from the web so that the part of the wrapper section end at the line of severance will lap on the free end of the web initially folded on the package, whereby a wrapper section so folded about the article can be sealed by passing the overlapped margins over a hot plate in a manner to melt a sealing medium with which the wrapper may be impregnated, or to set a sealing medium which is applied to the wrapper.

A further object of the invention, as applied to a machine in which the article is side-wrapped in the free end of a wrapper web and thereafter the wrapper cut from the web, is to provide means whereby the web cutter will sever the web in space when stretched between two points of support so that there will be no surfaces on which the sealing medium will collect, or against which the wrapper will be allowed to stick and interfere with the feeding of the wrapper. This is important when wrapping warm articles, such as bread, in a warm room and when using a wax paper in which the wax is softened by the temperature of the room.

Another object of the invention is to produce a construction of this character in which adhesive medium will not come in contact with the article being wrapped in the event of failure of the machine to present a wrapper section to the article.

A further object of the invention is to produce an improved web feed mechanism which is so related to the mechanism for feeding of the articles into the machine as to render the web feed mechanism inoperative in the event an article is not in place in the machine to be wrapped, and thereby avoid wastage of wrapper material and clogging of the machine.

A further object of the invention is to provide an adjustment of the web feed, so constructed as to act on the continuous web in the first feed stage of the web to regulate the position of the first web fold on the article when wrapped and also to adapt the wrapper web to articles of different cross-sectional dimensions.

Another object of the invention is to provide a form of discharge runway for heating and sealing the side wrapped articles so shaped as to conform to the shape of the bottom of an article, such as a loaf of bread which, on cooling, shrinks at the center of the bottom of the loaf, so that the folds of the wrapper on the bottom of the article will be accurately applied to the shape of said bottom and heat sealed or pasted thereon.

A further object of the invention is to provide an improved mechanism which is so constructed that the article, after having been fed to the machine is maintained in a true path through the wrapping mechanism, thereby making it impossible for the article to turn over while the wrapper is being applied thereto and sealed thereon, or for the wrapper to become twisted on the article.

Another object of the invention is to produce a novel arrangement of end flap tuckers constructed to adapt themselves to articles of different lengths and to centralize the articles with respect to the fore and aft center line of the machine and to smoothly and firmly iron the end flaps which they engage against the ends of the package.

A further object of the invention is to produce novel end flap tucking means combined to cooperate with the side wrapping of the article so as to fold the end flaps in a simple way, principally during the side wrapping of the article, so that thereby the mechanism is compact and little likelihood occurs to permit twisting of the wrapper on article.

A further object of the invention is to produce a folding and cooperating web feed mechanism arranged to effect complete side wrapping of the article by compactly arranged folding devices constructed to occupy a small space in the machine so as to enable the web to be held closely on the article and thus avoid likelihood of the web twisting on the article and to avoid derangement of the article during the wrapping operation.

Another object of the invention is to produce very simple operating and control means for the various operative elements of the machine, so constructed as to time the operation of the elements with respect to each other, and to provide a machine of this character which can be operated without gears or driving chains.

Other objects of the invention are to improve and simplify wrapping machines and reduce their cost of construction as compared to their output.

The invention is herein shown as embodied in a structure that is adapted particularly for wrapping loaves of bread, and the invention will be developed in the following description in respect of this particular structure. In a machine for wrapping loaves of bread the said loaves are both side and end wrapped and the wrappers sealed thereon.

Certain peculiar problems arise in wrapping loaves of bread and the present machine has been developed with a view of meeting these problems in a way to produce an attractive weather proof package with a minimum use of wrapper material. Bread loaves of the same weight vary considerably in their peripheral contour and dimensions by reason of the fact that the material of the loaves overrun or project over the top of the pan in baking, and this condition makes it difficult to wrap such loaves neatly, fully and with an economical use of wrapper material. Moreover, the bottoms of such loaves shrink in cooling to produce a concave contour thereat, and it is a problem to seal the overlapping margins on such bottom throughout and insure efficient sealing. Some of the features of the illustrated machine have been designed to meet these and other problems. A machine embodying other features of the invention, however, may be adapted for wrapping other articles of varying shapes which require both side and end wrapping and sealing, or which require only side wrapping and sealing. The invention is not limited to the structural details of the embodiment shown, except as to claims wherein the details are particularly set forth, and as imposed by the prior art, it being the intent to claim all of inherent novelty shown in the drawings and described in the specification.

In the drawings, showing a bread wrapping machine comprising one embodiment of my invention:

Figure 1 is a side elevation of the machine.

Figure 2 is a plan view thereof, with parts omitted.

Figure 3 is a vertical section on the indirect line 3—3 of Figure 2.

Figure 4 is a horizontal section on the indirect line 4—4 of Figure 1, with parts shown in plan elevation.

Figure 5 is a horizontal section taken generally on the indirect line 5—5 of Figure 6, with parts omitted.

Figure 6 is a vertical section on the line 6—6 of Figure 2, with parts omitted.

Figure 6$^a$ is a detail section on line 6$^a$—6$^a$ of Figure 6.

Figure 7 is a view similar to Figure 6, with further parts omitted, and some of the parts shown in changed positions.

Figure 8 is a perspective view illustrating the shelf on which the loaf is first delivered and at the point where the first side fold and end flaps are initiated.

Figure 9 is an enlarged section on the indirect line 9—9 of Figure 3 looking forwardly.

Figure 10 is a detail section illustrating a portion of the wrapper knife cutting mechanism and the position of the parts just before said knife becomes active to sever the wrapper web.

Figure 11 is a horizontal section on the line 11—11 of Figure 10, with parts in elevation.

Figure 12 is a view generally similar to some of the parts shown in Figure 10, with parts in changed positions.

Figure 13 is a vertical section on the line 13—13 of Figure 1 looking forwardly.

Figure 14 is a vertical section on the line 14—14 of Figure 13, looking in the direction indicated by the arrows.

Figure 15 is a vertical transverse section on the line 15—15 of Figure 1, looking rearwardly.

Figure 16 is a perspective view illustrating a portion of the discharge runway, one of the adhesive receptacles through which one of the end flaps trails and the folding means for folding the said end flap beneath a loaf.

Figures 17 and 18 are plan views of the loaf lifter, showing two portions of the initial end flap tuckers and the means for actuating the same.

Figures 19 and 20 are respective end and side views of grippers which hold the wrapper web against the loaf to insure proper feeding of the wrapper web during its second and third feed stages.

Figure 21 is a perspective view illustrating the position of the wrapper folds and flaps on the loaf before the wrapper web is cut.

Figure 22 is a view of the loaf and wrapper similar to that shown in Figure 21, showing the wrapper section cut from the web.

Figure 23 illustrates the wrapped loaf after the bottom fold has been made and all of the end flaps folded with the exception of the last flap.

Figure 24 illustrates one type of package with the final end flap in position to be turned beneath the bottom of the package.

In some of the figures indicated as sections on other figures the sections are not true sections because positions of the mechanisms have been changed to show different relative positions thereof and to better illustrate the operation of the machine.

Before proceeding with the description of the machine, reference is made to Figures 7, 8, 12, and 14 and 21 to 24, inclusive, to describe how the wrapper web is wrapped about the loaf to produce the side folds and end flaps. The free end of the wrapper web W is first laid across the top of the loaf and is projected therefrom a distance to provide an overchanging length sufficient to produce the front side fold $w$ and one half $w'$ of the bottom fold. Thereafter the wrapper end is assembled on and is pressed against the loaf and during subsequent wrapping movements of the loaf the continuous wrapper web is drawn forwardly from a roll or other source of wrapper supply and is laid successively over remaining sides and the bottom of the loaf, and thereupon the wrapper is severed from the continuous web and the ends of the wrapper section thus produced and side wrapped on the loaf are brought together at the loaf bottom in overlapping relation. Primarily the wrapper web end is fed with its free end portion above the loaf, in what will hereinafter be termed the first stage of the web feed, a distance beyond the loaf greater than the known width of the loaf equal to a length to constitute a part $w'$ of the bottom fold. Said end portion is then draped across the path of the loaf by means of a loaf lifter or transfer element hereinafter described. The loaf is thereafter pushed across the downturned end portion of the web, onto the loaf lifter, as will be clear from what is shown in Figures 7 and 8, to produce the front side fold $w$ and one half $w'$ of the bottom fold, the latter being formed when the loaf is moved onto the loaf lifter, as indicated. While the loaf is thus moving forwardly the web is held or pressed on the loaf by suitable gripping means applied to the loaf to prevent the web from slipping on the loaf, and to thus automatically draw forwardly a further web length from the wrapper web source to constitute the second wrapper web feed stage and to draw and measure the top fold $w^2$ over the top of the loaf. Thereafter the loaf is shifted upwardly by the loaf lifter, which may have a swinging or a reciprocating movement, to bring the partly wrapped loaf to the level of the receiving end of a discharge runway. While the partly wrapped loaf is thus being moved or transferred upwardly, the wrapper web is again drawn automatically forwardly through the third or final feed stage of the wrapper and for the purpose of measuring and drawing downwardly over the rear side of the loaf the rear side folds $w^3$ of the wrapper web and the part $w^5$ of the bottom fold. This position is shown in Figures 10 and 21. The wrapper web is severed below the level of the bottom margin of the rear side fold $w^3$ such distance as to produce the remaining or final one half bottom fold $w^5$ of the wrapper, and the loaf is pushed rearwardly onto the front end of the discharge runway to fold said last half bottom fold $w^5$ in underlapped relation to the first half bottom fold $w'$ to complete the side wrapping of the loaf.

The said wrapper web may be full wax paper and the overlapped folds at the bottom of the loaf may be passed over a heater to fuse the wax and seal the loaf; or paste or glue may be applied to the half bottom folds just before passing beneath the loaf, and the wrapper thereby sealed about the loaf.

As the machine shown is organized, some of the end flaps $w^6$, $w^7$, $w^8$, $w^9$ and $w^{10}$ of the wrapper are folded during the side wrapping of the loaf, and the folding of the other end flaps is completed after the side wrapping. Said end flaps $w^7$, $w^8$, and $w^9$ are folded inwardly over each other against the ends of the loaf, as shown in Figure 23. The half end flaps $w^6$ and $w^{10}$, constituting, respectively, integral extensions of the front side folds $w$ and bottom fold $w'$ and of the the rear side $w^3$ and bottom half fold $w^5$, are folded inwardly upon each other to produce full bottom end flaps $w^{11}$ (Figure 23). This full end flap may be folded up over the other end flaps, or under the two overlapping bottom folds, as will hereinafter more fully appear. The said end flaps may be sealed together by the wax by which the wrapper is impregnated, or hot paraffin or paste may be applied to seal said end flaps on the ends of the loaf.

Referring now to the construction of the illustrated machine constituting one embodiment of the invention, the frame of said machine consists of like side parts comprising upper and lower rail members 25, 26, and uprights 27, 27', 27² and 27³, tied together by tie rods 28 and other tie connections hereinafter mentioned. The said frame may be supported at its rear on wheels 29 rotative on the rear tie rod 28, and at its front end on short standards 30. When thus arranged, the use of hand bars 31 at the front of the machine enables it to be transported from place to place in the general manner of a wheel barrow. This mode of movement is especially adaptable to small machines. The hand bars can be hinged to the frame to normally hang vertically from their hinge pins, and their upward swing can be limited by stop pins 32.

35 designates a horizontally reciprocable slide supported and guided in movement on the upper frame members 25 through the medium of tracks 36 (Figures 5, 13, and 15) engaging downwardly facing V-grooves at the sides of the slide. Said slide is reciprocated from a main drive shaft 39 through the medium of a pitman 40 that is connected at its rear end to a depending bracket 41 fixed to the slide and is connected at its front end to a crank pin 42 of a drive disc 43 that is fixed to and rotates with said drive shaft. Said disc 43 is peripherally formed as a cam for the purpose of supporting and giving swinging movement to a loaf lifter, as will hereinafter be described. Said drive shaft may be rotated by a belt pulley 44 (Figures 1, 2, and 4) or any other suitable connection to driving power.

The said slide, in the present embodiment of the invention, constitutes part of an intermediary mechanism to give movement to a feed plunger 51 to feed the loaves L to the machine in position for the free end of the wrapper web to be assembled therewith at the beginning of the loaf wrapping operation. The loaves L are delivered by the plunger 51 endwise onto a horizontal shelf or support 50 that is supported transversely across the machine frame at the front end and above the forward end of the slide 25. The plunger 51 operates in a feed way 52 which extends endwise from said shelf, and the loaves may be presented sidewise to said runway by a fixed, inclined feed trough 53 in which the loaves are mutually supported and through which the loaves can be fed by gravity. The feed way is provided at its rear side with a stop 55 to hold the loaves properly in line, and said stop may extend inwardly in rear of said shelf 50 to constitute a guide 56 to guide and support the loaves properly thereon. When so arranged the shelf may be inclined rearwardly so that the loaves will rest against said guide, as shown in Figures 3, 6, and 7. The feed shelf is also provided at its end remote from the plunger 51 with an adjustable end stop or flange 58 (Figure 5) to prevent overthrow of the loaves delivered to the table; the adjustment being shown as screws extending through slots in said stop (Figure 5). The said plunger is provided with an endwise extended stop extension 57 to hold the loaves from falling into the feedway at a time when the plunger is at the inward stroke of its feed movement (Figure 5).

In the present construction said plunger is reciprocated through connection to the slide 35 by means of an L-shaped lever 60. It is pivoted at its angle to a stud 61 that is fixed to a bracket on the frame. One arm of said lever is pivoted at 62 to the feed plunger. The other arm thereof lies transversely over said slide 35 and is loosely connected to the slide by a pin 63 operating in the slotted end of said arm, said pin lying across the center of said slide remote from the pivot stud 61.

67 designates a transfer element or loaf lifter by which the loaves, partially wrapped as they are forced thereon from shelf 50 are raised from the level of said shelf to the level of the receiving end of a discharge runway 75, hereinafter described. As herein shown, said loaf lifter is a swinging structure, but, so far as the broader phase of the invention, in respect of its function, it may be otherwise operated. It comprises a flat plate and two forwardly directed side members 68 that are pivoted at their front ends on a cross or tie rod 70 that extends between the upper ends of the front frame posts 27³. The said loaf lifter thus pivoted to the frame, is supported between its ends on, and the rear end of the loaf lifter is caused to rise and fall through the influence of the cammed periphery of the rotating disc 43 before mentioned. As shown, the weight of the loaf lifter is borne on the peripheral cam of said disc through the intermediary of a bearing roller 72 (Figures 3, 6, and 7). When said bearing roller is engaged with the lower part of the cam periphery (Figures 3 and 7), the rear end of the lifter is in horizontal alignment with the loaf shelf 50, and when said bearing roller is engaged with the higher part of said periphery (Figure 6), said loaf lifter is tilted and its rear end is in line with the front, lower, receiving end of the discharge runway 75. The high and low parts of the cam periphery are of about equal lengths. The front end 75 of said runway is oblique to the plane of the slide 35 and lies in the plane of the loaf lifter when the latter is in its upper inclined position, as shown in Figure 6, while the rear end 75' thereof is horizontal. A spring 73 (Figures 1, 3, and 7) tensioned between a lug on the loaf lifter and a fixed part of the frame, holds the bearing roller on the cammed disc 43. Desirably counterweights 74 may be adjustably connected to rearwardly extending arms 74' rigid with the front end of the loaf lifter to avoid objectional vibration and to enable the machine to be speeded up.

When the loaf lifter is in its upper position side wrapped loaves may be delivered directly from the lifter onto the forward end of the runway by a plunger 76 slidable in a fixed path over the loaf lifter. The said plunger is carried by, and obliquely depends from, a bar 77 that is arranged above and obliquely to the plane of the loaf shelf 50 and parallel to the receiving end 75 of the loaf discharge runway. It has a simple reciprocating movement to carry the plunger back and forth in timed relation to the swinging movement of the loaf lifter. The narrow rear end 78 of said bar is guided and supported in a loop 79 (Figure 2) carried by a cross bar 80 which extends between the upper ends of extensions of the frame standards or posts 27'. The wider front end 82 of the plunger bar is slotted at 83 and fits over and is guided by the tie rod 70, as shown in Figures 1, 3, and 6. The said plunger bar is given reciprocatory movement through a pitman 85 that is loosely connected at its front end by a pin 86 to the front end of the bar and is loosely connected at its rear end to the crank pin 42 of the drive shaft disc 43. It will thus be seen that the said slide 35, the loaf feed plunger 51, and the plunger bar 77 and its plunger 76 are moved in unison and in timed relation to each other and to the swinging movement of the loaf lifter, and that such timed movement is a very simple one and can be simply controlled.

The slide 35 carries at its forward end one or more forwardly directed loaf ejectors 87 which engage and force a loaf forwardly from the shelf 50 into the loaf carrier 67 when the latter occupies its horizontal position, as shown in Figures 3 and 7. Two laterally spaced loaf ejectors are shown (Figure 5) and the rear guide 56 is formed with clearance spaces through which said loaf ejectors play. Said spaces may be made of any size desired to provide for ejectors having the required breadth of loaf engaging faces.

The free, unattached end portion of the wrapper web W is advanced to lie over the loaf when the parts are in the position shown in Figure 6, ready to be assembled in wrapping relation on the loaf. Said web may be unrolled from a reel 88 supported on brackets 89 at the rear end of the machine and said web is payed off said roll over suitable web slack control devices, such as are shown in Figure 1. The web is guided in forward movement from said roll and slack control means through guide fingers 89 and over horizontal web supporting bars 90 (Figures 3, 6, 7, 13, and 15) above the slide 35 and carried by a rear cross bar 91 and an intermediate cross bar 92 fixed on extensions of the frame standards 27, 27'. Said web supporting bars extend forwardly beyond the intermediate cross bar 92 and sustain at their front ends a metal plate 95 which is transversely widened and looped over at its end 95' above the loaf shelf 50 to constitute a paper guide or eye 96 through which the free end of the wrapper web is threaded.

It may be stated here that the web thus supported and guided is fed forwardly from the paper guide or eye 96 during forward movement of the slide 35 and at a time when the loaf lifter occupies its elevated position, as shown in Figure 6, so that when the loaf lifter is subsequently swung downwardly the free unattached or fed out end of the web is draped down over or in the path of the loaf (Figure 7). This extended free, downturned end of the web as herein shown is of sufficient length to cover the front side of the loaf and a portion of the bottom thereof. Means are provided, presently to be described, which positively feed the web forwardly in the first wrapper feed stage, and the length of wrapper thus fed from the guide eye can be regulated by an adjustment, presently to be described, to correspond to the known width of the loaf. This is the only adjustment required for adapting the wrapper to the loaf.

The means shown for thus positively feeding the wrapper web forwardly through its first feed stage of wrapper movement are made as follows:

100, 100 designate upright brackets, one at each side of the slide 35. They are formed with feet 101 by which they may be fixedly attached to the upper face of said slide. The upper ends of said brackets 100 are disposed laterally outside of and are abreast the wrapper supporting bars 90. 102, 102 designate nipper jaws above the plane of the wrapper web W and which are non-rotatively fixed to a rock shaft 103 that extends between and is mounted at its ends to rock in the upper ends of said brackets 100. 104 designate short, inwardly extending studs made integral with or attached to said brackets and are below the plane of the wrapper web W. The said nipper jaws are formed with bearings 105 which are adapted to coact with said studs when the jaws are swung forwardly in the manner shown in Figure 6, so as to pinch or nip the margins of the wrapper web W between them, whereby the web is locked to travel with the nipper jaws. When said jaws are swung rearwardly out of contact with the wrapper web, said wrapper web is released therefrom. When said nippers, comprising the upper jaws and lower lugs, thus engage the wrapper web and the slide 35 is moved forwardly, the said web is positively fed forwardly through the first stage of the wrapper feed movement until the nippers are released.

The nipper jaws are held in both their open and closed positions by means of locking pins 107 which extend laterally and outwardly over curved guide faces formed on the front faces of the brackets 100 concentrically to the axis of the rock shaft 103. Said pins are confined between said faces and springs 109, which latter have rearwardly curved formations that oppose said curved faces of the brackets, and past which said controlling pins are shifted in the swinging movements of the nipper jaws. The said curved faces of the brackets permit the locking pins to freely travel thereover when the nipper jaws are swinging, and the curved formation of the springs lock the jaws either in their closed or open positions. The means for controlling the nipper jaws for thus swinging them into opening and closing positions are made as follows:

114 designates a horizontally swinging bar that lies along the left hand side of the machine frame. It is fixed at its rear end to a vertically rocking bearing block 115 that is mounted to rock in brackets 116 fixed to one of the rear standards 27 of the machine frame. The front end of the bar is thus free to swing horizontally toward and from the machine frame. Fixed to said bar 114 in rear of the standard 27' is an inwardly extending arm 118 which is provided at its inner end and on its forward edge with a downturned, nipper jaw actuating lip 119. It is adapted to be shifted into and out of the path of an upstanding arm 102' of the left hand nipper jaw 102 through horizontal swinging movement of the bar 114. 118' (Figures 4 and 5) designates a second arm which is attached to and extends inwardly from the bar 114 and is in line with the loaf shelf 50. Said arm is adapted to be struck by the adjacent end of a loaf, when the latter is fed onto the shelf, whereby the bar is caused to be swung outwardly in a direction to carry the actuating lip 119 into the path of the arm 102' of the associated nipper jaw. Such contact between said nipper jaw arm and lip occurs at the rearward limit of reciprocation of the slide 35 and operates to swing both nipper jaws downwardly against the margins of the wrapper web in a manner to pinch the web between said jaws and the lower fixed studs or jaws 104. The wrapper web is thus locked to travel with the slide 35, and the web, whose forward end projects just beyond the guide eye 96, is moved forwardly with the slide until the nippers are released from the web. Such release is effected by an adjustable tripping device presently to be described. The distance to which the free end of the wrapper web is thus fed forwardly over the loaf depends upon the known width of the loaves being wrapped to which dimension the feed mechanism can be adjusted, as herein described, there being a sufficient length of wrapper fed in this first stage feed of the web to cover the forward side and a portion of the loaf bottom.

The forward end 114' of the bar 114 dips downwardly and inwardly and lies inside the plane of a disc 120 that is fixed to the drive shaft 39 just inside the drive pulley 44. The said disc 120 carries on its inner side a relatively short, inwardly directed cam 121 which is adapted, once in each rotation of the drive shaft, to engage a downturned bearing 122 on the forward end of said bar. Contact of said cam 121 with said bearing 122 swings the said forward end of the bar inwardly about its hinge and thus carries the arm 118 inwardly to move its actuating lip 119 inwardly beyond and away from the path of the upwardly extended arm 102' of the left hand nipper jaw 102. This movement of the bar 114 also moves the arm 118' inwardly over the adjacent end of the loaf shelf, to be engaged by the next loaf fed into the machine and to thereafter control the wrapper web nippers.

The tripping of the nipper jaws to free them from the wrapper web after a sufficient length of the web has been thus fed forwardly is effected by a fixed, shouldered, tripping lug 125 that is engaged by an upwardly extending arm 102' of the left hand nipper jaw in its forward movement, such engagement swinging said arm rearwardly and lifting the bearing members of the nipper jaws out of gripping contact with the wrapper web. Said lug 125 is mounted on a plate that is carried by the forward end of a bar 126 that lies above and inwardly beyond the swinging bar 114 in the plane of travel of the left hand nipper jaw. Said bar 126 extends beneath and is fixed to cross or tie bars 127, 128 of the frame (Figures 1, 3, and 6). The tripping lug 125 is adapted to be adjusted longitudinally along and locked to its bar 126 by screws 130 that extend through slots in the plate on which the lug is formed and are threaded into said bar. This adjustment determines the length of the first stage feed of the wrapper web and is the only adjustment required for such feed. When the wrapper feed nipper jaws are thus tripped the arm 102' of the controlling or left hand nipper jaw rides underneath the edge face of the lug 125; and said nipper jaw will not be closed down over the wrapper web until at the rearward movement of the slide the nipper jaw arm 102' contacts with the tripping lip 119, if the latter be shifted outwardly under the control of a loaf previously fed onto the shelf 50.

From what has been said, it will be evident that failure to feed a loaf on the shalf 50 and, therefore, failure to swing the bar 144 outwardly, leaves said bar in the position into which it has been swung by the cam 121, and, therefore, with the actuating lip 119 inwardly beyond the path of the arm of the left hand nipper jaw. Therefore, reciprocation of the slide will not actuate the nipper jaws and no wrapper web will be fed. In other words, the first stage wrapper web feed is effected only by the presence of a loaf on the shelf 50.

The free, unattached end of the wrapper is fed forward at a time when the rear end of the loaf lifter is elevated (Figure 6), and during the period when the loaf feed plunger 51 is retired. The feed movement of the web is but a short part of the full reciprocating movement of the slide and its loaf ejectors. In the next downward swing of the loaf lifter the rear end edge thereof strikes and folds down the free end portion of the wrapper web into the position shown in Figure 7. Thereafter, and subsequent to the tripping of the nipper jaws, and to the full forward feed of the wrapper web, the continued advance of the slide 35 and the loaf ejectors 87 forces the loaf from the shelf 50 onto the rear end of the loaf lifter, or from the position shown in Figures 7 and 8 to that shown in Figure 3.

As the loaf moves onto the rear end of the loaf lifter means are operated to cause the loaf to seize and carry with it the free overhanging wrapper web and, by a trailing action, turns the half bottom fold $w'$ beneath the loaf. Said movement also forces said wrapper web against upstanding wrapper grippers 135, formed on the forward ends of sliding bars 136 which are supported on the loaf lifter and are guided in movement by rear and front guides 137, 138 (Figures 2, 4, and 7). Said grippers have rear, roughened or serrated faces for contact with the fold $w$ of the wrapper, such as may pierce the wrapper web to hold the wrapper web between them and the loaf and prevent the web slipping on the loaf (Figure 19). Therefore, the continued forward movement of the loaf, under the action of the slide 35 and ejectors 87, pulls the web with it to constitute the second stage of the wrapper feed. In order to control the forward movement of the gripper bars 136 and thus hold the grippers 135 firmly against the partially wrapped loaf to prevent slipping of the web on the loaf, one of said bars is engaged with a brake disc or plate 155 which surrounds the cross shaft 70 and is backed by a strong spring 156 (Figures 2, 4, and 5) interposed between the disc and a fixed part of the frame.

The said gripper bars 136 rise and fall with the loaf lifter, and are connected together to move as a unit by a flat web 140 that slides on the loaf lifter. Said gripper bars are shifted rearwardly from their forwardmost positions, after a partially side wrapped loaf has been delivered fully onto the loaf lifter and the rear end of the latter is elevated, and at a time when the plunger 76 is moved rearwardly to move a partially wrapped loaf onto the front end of the runway 75, by engagement of a shoulder 142 on the widened end 82 of the plunger bar 77 (Figure 12) with the front edge of said web 140.

145, 145 designate spring, down-held, bearer fingers beneath which the partly wrapped loaf passes as it is delivered onto the loaf lifter for the purpose of holding the wrapper web properly on the loaf during the time the loaf is being transferred by said lifter to the receiving end 75 of the runway, and also while the wrapper web is being cut or severed, as best shown in Figure 10. Said fingers are hinged at their front ends on the said cross shaft 70 and extend upwardly from their hinged ends and are thence curved downwardly and rearwardly towards the loaf receiving position of the lifter. They are tied together between their ends by a plate 146 to operate in unison. A spring 148, connected between the frame and a cross bar 149 extending between the fingers (Figures 1, 3, 6, and 7) tends to hold the fingers normally depressed against a partially wrapped loaf when the rear ends of the fingers are engaged therewith, and the depression of said fingers is arrested, against the action of said spring 148, when the loaf lifter is in its horizontal position (Figure 7) by a roller 150 on one end of said cross bar that rides on the upper edge of a cam plate 151 which is fixed to and rises from one of the gripper bars 136. The rear end of the cam edge is inclined downwardly and rearwardly to permit the rear curved ends of the fingers to drop on the partially wrapped loaf just as it is delivered from the shelf 50 onto the loaf lifter. The said fingers bear on the partially wrapped loaf during the rise of the loaf lifter and until the plunger 76 pushes the loaf onto the runway 75.

The free ends of said bearer fingers 145 are supported on the plunger 76 and on a cross bar 155 forwardly thereof in the interval between the down swing of the loaf lifter and the retraction of the plunger 76, and are at other times supported, through the bearing roller 150, on the cam plate 151, except at times when the rear ends of said fingers are bearing on the partially wrapped loaf in the position shown in Figure 3. In the position shown in said Figure 3 the partially wrapped loaf has forced the gripping bars 136 forwardly, and therewith the cam plate 151 so that the bearing roller is above and out of contact with the rearwardly inclined edge of said plate and remains out of contact therewith until the latter is drawn rearwardly, along with the gripper bars by engagement of the shoulder 142 of the plunger bar with the connecting plate 140 of the gripper bars 136.

The wrapper section is severed from the web that has been wrapped sidewise about the loaf by a forwardly and rearwardly movable web cutter, herein shown as having the form of a toothed blade 160 just as the partially wrapped loaf is being pushed from the loaf lifter onto the front end of the runway 75, and in position to engage the web with a folding surface on the runway and to hold the web by pressure traction taut on the article before the severance takes place and thereby avoid slackening of the web on the loaf after severance of the web. Said cutter blade is attached to and is movable with a plate 161 that extends transversely across the machine above the web guide eye 96 (Figures 3, 4, 6 and 7). One end of said plate 161 extends in overhanging relation laterally from, and is shown as made integral with, an upright arm 163 at the left side of the machine that is hinged to a stud 164 fixed to the machine frame. Said arm 163, therefore, is swingable fore and aft of the machine. Inasmuch as the knife carrying bar 161 is rigid at one end with said arm and is free at its other end, swinging movement of said arm 163 causes the cutting knife to move to and fro in short strokes over the guiding eye such distance as to sever the wrapper web when moved forwardly, and to be free from said web when in its normal rearward position. The cutting movement of the knife is controlled by the following mechanism:

165 designates a spring which is stretched between one end of said knife carrying bar and a fixed part of the machine in front thereof, as the shaft 70. Said spring tends to pull the knife into its cutting position. The knife is held normally away from its cutting position by a forwardly extending control arm 166 fixed to and extending forwardly from the swinging arm 163, and carrying a roller 167 which bears against the periphery of the disc 120 on the drive shaft 39, before mentioned. The periphery of said disc is formed with a short cam depression 170 (Figures 1 and 10). The higher part of the periphery of said disc holds the cutting knife rearwardly throughout the greater part of the rotation of said disc and shaft, against the action of said spring 165, and said spring acts, when the bearing roller drops into said cam depression, to sharply shift the knife forwardly to sever the wrapper web just as the side wrapped loaf is pushed onto the runway 75. The severance of the web is made at a time when the web is stretched taut, caused, first, by the rise of the loaf lifter to the level of said runway 75, with the fingers 145 bearing against the top of the loaf, and, second, by a brake momentarily placed on the wrapper web in the manner hereinafter described. It will be noted that the wrapper web is cut when not supported at either side of its severance line by an adjacent fixed part. It may be said to be cut in mid air. An advantage of this arrangement is that it leaves no free wax to adhere to parts, which might otherwise clog the wrapper web feed if the wrapper be supported at sides of its cut line.

The means for effecting a brake on the wrapper web at the time the knife severs the wrapper are made as follows:

172, 172 designate vertically swinging brake dogs that are hinged at their upper ends to a tie bar 173 which extends across the rear end of the machine frame. The lower ends of said dogs are provided with friction faces 174 (Figure 15) which are adapted to bear, at the proper time in the cycle of the wrapper web feed, on the web and to pinch said web between said friction faces and an underneath fixed gripper bar 175 that extends transversely across the machine. Said dogs are normally held rearwardly inclined and out of contact with the web to permit the web to be fed freely thereunder, but are adapted to be swung forwardly to grip the web when the cutting knife strikes forwardly in its cutting movement. This control of the brake dogs is shown as effected by means of parallel, fore and aft, bars 177 that are hinged at their forward ends by pins 178 to the knife carrying bar 161 and are connected at their rear ends by lost motion devices to the lower ends of said dogs 172. Said lost motion devices consists of short, horizontal slots 179 in said bars that receive pins 180 which extend laterally from the lower ends of said dogs. The relation of the length of the said slots to the throw of the bars 177 is such that when the knife carrying bar is in its rearmost position the forward end walls of said slots engage said pins 180 to hold said dogs out of contact with the wrapper web to permit the web to be fed freely beneath them. When the knife carrying bar moves forward, however, the bars 177 are shifted forwardly and permit the brake dogs to drop down into contact with the wrapper web. The weight of said dogs is sufficient to effect a brake action on the web during the operation of the knife.

In order to prevent the wrapper web from springing backwardly when the brake dogs are normally released, a check dog 182 is hinged to said tie bar 173 to swing forwardly therefrom. It normally assumes the position shown in Figures 3, 6, and 7, with its friction face 183 (Figure 15) engaged with the wrapper web. It can be spring held against the web to prevent rearward movement of the sheet, but its pressure on the web is not sufficient to prevent normal forward feed movement of the web.

At this point it will be observed that the loaf is wrapped in the end portion of the wrapper web without the use of specially constructed and controlled nippers to engage and hold the end edge of the web, but the free end portion of the web is held on the loaf which is being wrapped by pressing it on the loaf in a manner to exert tractive force on the web throughout substantially the entire side wrapping of the loaf to pull the web towards, and to neatly and closely wrap it on, the loaf to produce a closely wrapped package, and with minimum use of wrapper material. It will be furthermore observed that the pull on the wrapper web to draw it off the reel or other source of wrapper supply is effected by pressure of the web against substantial areas thereof, backed by the loaf, so that there is no likelihood of the free end portion of the web slipping or twisting on the loaf during the wrapping operation and that the loaf is substantially fully side wrapped as the individual wrapper is severed from the web. Therefore there is no likelihood of the wrapper slackening on the loaf after it has been severed from the web.

The machine has been thus far described with reference only to side wrapping of the loaf. For some products, such as stick candy, confections, known as "suckers" and the like, only side wrapping may be required. Products like bread loaves, chocolate, peanut bars, soaps, cartons, and the like require to be end wrapped, as well, and packages of all kinds should be sealed, either side sealed or both side and end sealed. I have shown a machine adapted for side and end wrapping and for both side and end sealing but, so far as the broader phase of the invention is concerned, it is to be understood that such mechanism may be considerably varied. The end wrapping mechanism shown is well adapted to the present machine and cooperates with certain operations of the machine directed to side wrapping and to maintaining the loaf centralized in the machine, and is hereinafter made the subject of specific claims.

The end flaps $w^7$ are formed by the rounded edges of tuckers 185 as the loaf is pushed from the shelf 50 onto the rear end of the loaf litter 67, as indicated in Figures 3 8 and 21, the said flaps $w^7$ being formed between the inner faces of said tuckers and the loaf ends. The half bottom end flaps $w^6$ are formed between the bottom edges of said tuckers and the top face of the loaf lifter simultaneously with the formation with the flaps $w^7$. Said tuckers are formed on the rear ends of bars 186 which are hinged at their forward ends by studs 187 to suitable bearings carried by the loaf lifter (Figures 2, 3, 4, and 7) to swing at their free ends towards and from each other. Said bars and tuckers, therefore, rise and fall with the loaf lifter. Said bars are spring held inwardly against suitable controlling stops 188 on the gripper bar connecting plate 140 acting against cam plates 188' fixed to the tucker bars (Figures 11, 17, and 18), as will hereinafter be described, to automatically adapt said tuckers to loaves of different lengths and also to cause the loaves to be centralized with respect to the fore and aft center line of the wrapping mechanism. Said tuckers 185 are spread away from each other by the pins 188 and cam plates 188' when a partially wrapped loaf is forced therebetween on the loaf lifter, as shown in Figure 17, but are sufficiently close together to engage the parts of the wrapper that lie beyond the ends of the loaf and which are subsequently formed into the end flaps. As the loaf is pushed further on the loaf lifter, the bars 186 are released so as to permit the tuckers to be spring pressed inwardly to form said end flaps $w^7$ and also to centralize the loaf.

The end flaps $w^8$ which extend from the top wrapper fold $w^2$, are folded downwardly against the loaf ends when the loaf lifter is swung upwardly by vertical tuckers 189 (Figures 1, 3, 10, and 11) which are fixed to and depend from blocks 190 carried by the front ends of plates 191 arranged above the plane of and laterally beyond the sides of the runway 75. Said plates 191 are hinged at their rear ends by pintles 192 mounted in brackets 193 carried by the frame structure (Figures 1, 2, and 3). Said plates are spring held at their forward ends against arms 194 which are fixed to and rise from the tucker bars 186, before referred to, in a manner to swing the free front ends of said plates 191 and the tuckers 189 inwardly towards each other and to press the tuckers 185 inwardly, as before mentioned, when not restrained by the stops 188. The spring means herein shown for effecting this result consists of spiral contractile springs 195 which extend between rearward extensions of said plates 191 beyond their hinge pintles 192, and upward extensions of said standards 27'. Said springs 195, therefore, serve to mutually press both tuckers 185 and 189 inwardly, by means permitting them to freely swing towards and away from each other and the loaf ends to accommodate loaves of different lengths and to iron the end flaps $w^7$, $w^8$ smoothly against the loaf ends, and also to centralize the loaf in the wrapping mechanism, as before mentioned. The end flap $w^9$ and the half end flap $w^{10}$ are folded inwardly toward the loaf ends by depending tuckers 198, shown as made integral with the tuckers 189 and spaced rearwardly therefrom; said flaps $w^9$ being folded between the inner faces of the tuckers 198 and the loaf ends and the flaps $w^{10}$ being simultaneously folded between the lower, forwardly rounded ends of the latter tuckers and the upper face of said runway, as indicated in Figure 11.

The full end flaps $w^{11}$, formed by bringing together the two half flaps $w^6$ and $w^{10}$ are folded upwardly against the loaf ends by downwardly opening, oblique, folding slots 200 (Figures 1, 3, 6, 10, and 12) formed in the front ends of diagonal plates 201 which flank the runway 75 inwardly beyond the plates 191. The rear ends of said latter plates are hinged on the pintles 192, before mentioned. The forward ends of said plates 201 engage the side edges of the runway plate 75 and are held thereagainst, as stops, by contractile springs 203 which are stretched between rear extensions of said plates and the upper ends of the frame standards 27'. The said plates 201 constitute the sides of the inclined part 75 of the runway beyond the tuckers 198 and are curved outwardly at their front ends 201' to allow the loaves to pass therebetween in a manner to iron the end flaps against the ends of the loaf, and their spring pressed mounting adapts them to spread from each other to receive loaves of different lengths and to be spring pressed against the end flaps of the wrappers to neatly iron them against the ends of the loaf.

By reference to Figures 17 and 18, it will be observed that the controlling pins 188 lie against the straight edges $c$ of the cam plates 188' of the tucker bars 186 when the loaf is first delivered on the loaf lifter, the camplates being pressed thereagainst by the springs 195. As the loaf is moved further forwardly the grippers 135 and their bars move forwardly carrying with them the plate 140 and the tucker controlling pins, so as to bring said pins opposite to the inclined or cam edges $c'$ of said plates 188'. Thereupon the springs 195 swing the forward ends of the bars 191 inwardly and, through the upstanding arms 194, forces the tucker bars 186 inwardly to cause the tuckers 185 to be pressed against the end flaps to partly press them against the loaf ends and to center the loaf.

If it be desired to seal the end flaps $w^{11}$ against the other infolded end flaps and the wrapper is a full wax paper, all said end flaps and the bottom fold sections may be heat sealed by passing the fully wrapped loaves through a channel cross section heater at any desired point in rear of the final up fold of said flap $w^{11}$; or said end flaps and the bottom folds may thus be heat sealed separately, if desired.

In a machine more specially adapted to wrapping loaves of bread it is desirable to fold the final full end flap $w^{11}$ down under against and seal it to the overlapping bottom sections $w'$ and $w^5$ of the wrapper. When this practice is to be followed there are arranged upstanding side plates 205 at the sides of the horizontal portion 75' of the discharge runway to give channel formation to the rear end of the runway. Said plates 205 extend at their forward end inwardly beyond the planes of the rear ends of the side plates 201 which flank the sides of the inclined portion 75 of the runway, and the rear ends of the latter plates 201 are turned laterally outwardly at 206 in their parts that overlap the front ends of said plates 205 (Figures 2 and 14). The lower edges of the plates 205 are inclined downwardly and rearwardly at 207 (Figures 1 and 14), where they overlap the rear ends of the plates 201. The bottom end flaps $w^{11}$ are, therefore, turned outwardly and downwardly as they pass from contact with the rear ends of the plates 201 and into contact with the oblique forward ends of the plates 205; and said latter plates are spaced from the runway 75' to receive said downturned flaps. The flaps $w^{11}$ thus turned downwardly trail through a sealing medium contained in open top tanks 209 arranged at the sides of and below runway 75' to become impregnated with a liquid sealing medium contained therein, such as hot paraffin. The contents of the tank may be heated in any suitable manner not necessary to be here shown. At the rear end of the runway 75' the bottom of the runway is provided with inwardly and obliquely directed flap folding slots 210 which are formed between the oblique edges of rearwardly diverging cut away portions of the runway plate 75' and correspondingly oblique edges of infolding tongues 211 arranged below said runway plate and shown as attached to the side plate 205 (Figures 2, 3 and 15). The said tongues 211 fold the flaps $w^{11}$ inwardly beneath the loaf and up against the overlapping sections $w'$ and $w^5$ of the wrapper, and said flaps are thus held in this position by contact with the upper face of the runway until the wrapped loaves are passed over a heating unit, such, for instance, as the channel shaped heating unit 212 at the rear end of the machine supported on brackets 213, as shown in Figures 6 and 6ª. The heating unit may be electrically or gas heated and when made of channel form serves to melt the sealing material in all the end flaps that lie over the loaf ends and in the inturned end flaps $w^{11}$ and overlapping bottom folds $w'$, $w^5$.

From an inspection of Figure 6 it will be noted that there is formed at the line where the parts 75 and 75' of the runway merge a ridge $75^2$ of small angle to conform to the transverse concave bottoms of a loaf, caused by the shrinkage of the loaf when cooling. The said ridge and a portion of the runway 75 will also preferably be curved transversely of the runway to correspond to the longitudinal concave of a loaf caused by such shrinkage of a cooling loaf.

The sealing face of said heater is made to conform to the shape of the article being sealed. When wrapping a loaf of bread, it would be high in the center, to conform to the depression on the bottom of the loaf (Figures 3, 6, and 6ª). Thus the folds and flaps are caused to closely conform to the loaf bottom when the sealing takes place, resulting in closed sealed joints. The wrapped loaves are pressed down upon the bottom of the runway during their discharge progress therethrough by presser bars 215 which are fixed at their rear ends to a rock shaft 216 mounted in the extensions of the frame standards 27 for vertical adjustment, and said bars are pressed on the loaves in the runway by a spring 218 which surrounds said rock shaft and is adjustably connected at its respective ends to said standard extension and a collar 219 fixed to said shaft. The pressure of said bars on the loaves holds the concave bottoms thereof against the convex runway bottom sufficiently long to cause the bottom folds of the wrapper to conform to the loaf bottom. Moreover, said presser bars serve to hold the wrappers firmly on the loaves while passing rearwardly through the runway. The wrapped and sealed loaves can be moved outwardly over a cooling plate 214 made of like convex contour to hold the sealed flaps against the concave bottom of the loaf from the heating unit, and the loaves are adapted to be pressed against said heating unit and cooling plate when passing thereover by a presser unit designated as a whole by 214' adjustably connected to the extension of the rear standards 27, as shown in Figures 1 and 6. Said cooling plate extends rearwardly from said unit and the loaves may be delivered to a take-off belt of known form to carry the wrapped and sealed loaves to a desired location.

If the end flaps $w^{11}$ are to be pasted or sealed against the other end flaps, the folding slots 210 may be omitted so that all the end flaps may be held against the loaf ends until they reach a heating unit to seal the same; and, in such event the end sealing and bottom sealing unit may be arranged to operate independently or may operate simultaneously, in which latter event they may take the form shown at 212 in Figures 3 and 6. So also when the end flaps $w^{11}$ are sealed against the end of the loaf, the side plates 201 and 205 will be arranged to constitute unbroken guide plates at the sides of the runway.

In the type of machine shown, the wrapped loaves are intermittently pushed through the runway by the plunger 76 each time a partly wrapped loaf is delivered to the forward end of the runway, the rear loaves being advanced by pressure of the loaves in front thereof. So far as the latter feature is concerned, the loaves may be otherwise advanced through the runway after being delivered to the front end thereof.

When wrapping the loaves in wrapper material that is not impregnated with sufficient wax to become heat sealed, or when using wrapper material devoid of wax, the folds $w'$ and $w^5$ that overlap on the bottom of the loaf may be caused to wipe over the ends of wicks 222 that extend through the tubes 223 of a sealing material tank 224 which is attached to the lower side of the rear end of the loaf lifter or transfer element 67, as by a screw bolt 225 (Figures 5, 6, 7, 8, 10, and 12). By reference to Figures 7 and 10 it will be noted that the fold $w'$ will wipe over said wick ends when the loaf is being transferred onto the loaf lifter or transfer element, and that the fold $w^5$ will be wiped thereover when the loaf is transferred onto the front end 75 of the discharge runway. The relation of the parts is such that the pasted faces of said folds will be brought together in the last transfer position. The sealing material in said tank 224 may be either paraffin or a true paste. If it be paraffin a heater may be applied to the tank to keep the material suitably warm for free flowing. When thus applying sealing material from the tank 224, the same kind of sealing material may be used in the tanks 209, and if of a kind necessary to be kept warm, suitable heaters may be applied to the latter tanks.

When wrapping articles that do not require end wrapping, such, for instance, as candies which can either be left open at the ends of the package, or which may be subsequently twisted, a sealing heater 230 (Figures 10, 11, and 12) may be located at the receiving end 75' of the runway, and in this arrangement the sides of the lifter 67 and the runway will be devoid of end flap folding tuckers. The same machine may practically be applied with both the heater 230 at the front end of the runway and the heater 112 at the rear end thereof, inasmuch as their heating faces will be flush with the runway; and when the machine is so equipped that heater will be employed best adapted to the work in hand.

I claim as my invention:

1. A machine for enfolding articles in the free end of a continuous wrapper web by a three stage feed of the wrapper web, comprising wrapping mechanism, including means to move an article therethrough, means to feed a length of the free end of the web across, and to assemble it with, the article to correspond with one vertical and a portion of the bottom dimension of the article, mechanisms successively operative while the said article is moving through the wrapper mechanism to draw the web in the respective second and third feed stages to correspond to the width dimension of the article, and to the other vertical and remaining bottom dimensions, and means to sever from the web the wrapper to permit its margins to be lapped one on the other and on the article.

2. A machine for enfolding articles in the free end of a continuous wrapper web by a three stage feed of the wrapper web, comprising wrapping mechanism, including means to move an article therethrough, means to feed a length of the free end of the web across, and to assemble it with, the article to correspond with one vertical and a portion of the bottom dimension of the article, mechanisms successively operative while the said article is moving through the wrapper mechanism to draw the web in the respective second and third feed stages to correspond to the width dimension of the article, and to the other vertical and remaining bottom dimensions, means to sever from the web the wrapper to permit its margins to be lapped one on the other and on the article, and means to adjust the length of feed of the wrapper web in the first feed stage thereof.

3. A machine for enfolding articles in the free end of a continuous wrapper web by a three stage feed of the wrapper web comprising wrapping mechanism, including means to move an article therethrough, means to position the free end of the wrapper web across an article presented to said mechanism of a length sufficient to cover one side and a portion of the bottom of the article, mechanism operating while the said article is moving through the wrapper mechanisms to successively draw sufficient lengths of the web in the respective second and third feed stages to correspond to the width dimensions of the article and the other vertical and remaining bottom dimensions, including means to press, and to maintain pressure on, the web against the article substantially throughout its wrapping movements, and means to sever the web from the wrapper to permit its margins to be lapped one over the other and on the article.

4. A machine for enfolding articles in the free end of a continuous wrapper web by a three stage feed of the wrapper web, comprising wrapping mechanism, including means for moving an article therethrough, means to feed a length of the free end of the web across, and to assemble it with, the article to correspond with one vertical and a portion of the bottom dimension of the article, mechanisms successively operative while the said article is moving through the wrapper mechanism to draw the web in the respective second and third feed stages to correspond to the width dimension of the article, and to the other vertical and remaining bottom dimensions, means to sever from the web the folded wrapper to permit its margins to be lapped one on the other and on the article, and wrapper closing means across which the overlapping margins of the wrapper are passed to close the wrapper.

5. A machine for enfolding articles in the free end of a continuous wrapper web by a three stage feed of the wrapper web, comprising wrapping mechanisms, means to position a length of the free end of the web across, and assemble it with, the article to correspond with one vertical and a portion of the bottom dimension of the article, said wrapping mechanisms including means to successively move the article through said mechanisms, and including means to measure the web in the respective second and third feed stages to correspond to the width dimension of the article and to the other vertical and the remaining bottom dimension while enfolding the web around the article, means to sever the folded wrapper from the web, and web feed brake means operative during the severing of the web.

6. A machine for enfolding articles in the free end of a continuous wrapper web by a three stage feed of the wrapper web, comprising wrapping mechanisms, means to position a length of the free end of the web across, and assemble it with, the article to correspond with one vertical and a portion of the bottom dimension of the article, said wrapping mechanisms including means to successively move the article in two directions, and including means to measure the web in the respective second and third feed stages to correspond to the width dimension of the article and to the other vertical and the remaining bottom dimension while enfolding the web around the article, means to sever the folded wrapper from the web, and brake means connected to the severing means to hold the web from forward feed movement during the operation of the web severing means.

7. A wrapping machine comprising a wrapping mechanism through which an article is caused to move, means to force an article and the free end of a wrapper web into the wrapping mechanism, together with means to press the free end of said web against the article and to maintain pressure to cause the wrapping movements of the article to draw the web on and wrap the article in it, and means to sever the wrapper from the web.

8. A wrapping machine comprising mechanisms to cause an article to travel through successive wrapping stages, mechanisms successively to position, and to press, the free end of a wrapper web on the article, the latter mechanism operative substantially throughout the wrapping movements of the article to draw the free end of the web on and wrap the article in it, and means to sever the wrapped article from said web.

9. A wrapping machine comprising successively operating wrapping means, means to receive in the machine an article to be wrapped, means to position the free end of a wrapper web across the path of the article, combined with mechanisms to force the article and web end into and through the wrapping means, means operative substantially throughout the folding movements of the wrapper web to cause pressure of the web against the article to wrap the article in the free end of the web, and means to sever the wrapper from the web as the wrapping is being completed.

10. A wrapping machine comprising means to position in the machine an article to be wrapped, means to advance a continuous wrapper web and position its free end across the article, means to adjust the length of the end of the web so advanced, means operative to move the article in the machine to draw the web towards and to wrap its free end about the article, and means to sever the folded wrapper from said web.

11. A wrapping machine comprising means to position in the machine an article to be wrapped in the free end of a continuous wrapper web, means to engage the wrapper web in rear of its free end to project said web and to position its free end across said article, means operative through movement of the article in the machine to further draw the web forwardly and fold it about the article, and means to sever the folded wrapper from said web.

12. A wrapping machine comprising means to position in the machine an article to be wrapped in the free end of a continuous wrapper web, adjustably controlled means to engage the wrapper web in rear of its free end to variably advance said web and to position its free end across said article, means operative through movement of the article in the machine to further draw the web on and fold it about the article, and means to sever the folded wrapper from said web.

13. A wrapping machine comprising means to position in the machine an article to be wrapped in the free end of a continuous wrapper web, nipper means to engage the wrapper web in rear of its free end to project it across the article and position its free end thereon, tripping means operative to release said nipper means, means operative through wrapping movement of the article in the machine to further draw the web forwardly and wrap it about the article, means to adjust said tripper means along the direction of advancement of the web, and means to sever the wrapper from the web.

14. A machine for enfolding articles in the free end of a continuous wrapper web by a three stage feed of the wrapper web, comprising wrapping mechanism, including means to move the article through successive wrapping positions, means to feed a length of the free end of the web across, and assemble it with, the article to correspond with one vertical and a portion of the bottom dimension of the article, means operative while the said article is moving through the wrapping mechanism to measure the web in the respective second and third feed stages to correspond to the width dimension of the article and to the other vertical and remaining bottom dimensions, including successively acting pressure means to hold the web against the article during the second and third feed stage of the web to prevent slipping of the wrapper on the article, and means to sever the folded wrapper from the web.

15. A wrapping machine comprising a support to receive an article to be wrapped, a discharge runway, means to position the free end of a continuous wrapper web across the path of the article, means to transfer the article from said support to said runway, means to enfold the free end of said web about the article during its transit from said support to said runway, and means to sever the folded wrapper from said web as the wrapped article is moving onto the runway.

16. A wrapping machine comprising a support to receive an article to be wrapped, a discharge runway, means to position the free end of a continuous wrapper web across the path of the article, means to transfer the article from said support to said runway, means to enfold the free end of said web about the article during its transit from said support to said runway, presser means to hold said web against the article during said transit to prevent slipping of the web on the article, whereby the web is drawn forwardly and is wrapped about the article, and means to sever the folded wrapper from the web as the wrapped article is moving onto the runway.

17. A wrapping machine comprising a support to receive an article to be wrapped, a discharge runway, means to position the free end of a continuous wrapper web across the path of said article on the support, a transfer element movable between said shelf and runway, with means to operate it, means to advance the article and the free end of the wrapper web from said support onto the transfer element, means to eject the wrapper web end and article from the transfer element onto said runway, presser means to hold the wrapper web from slipping on the article during the transfer of the article through the folding mechanism to insure drawing the wrapper web to and wrapping the article in said end, and means to sever the folded wrapper from the web as it is being moved onto said runway.

18. A wrapping machine comprising a support to receive an article to be wrapped, a discharge runway, means to position the free end of a continuous wrapper web across said article when on said support, a transfer element movable between said support and runway with means to operate it, said transfer element operating in its non-transfer movement to engage and to drape the free end of the wrapper web across the path of the article, means to advance the article and the free end of the wrapper web onto the transfer element, gripper means against which the article and web are forced to hold the web on the article and thereby draw the web forwardly when the article is advanced onto the transfer element, a plunger for advancing the wrapped article onto the runway, presser means to hold the web on the article when being advanced on said runway, and means to sever the folded wrapper from the web as it is being advanced onto said runway.

19. A wrapping machine comprising means to position in the machine an article to be wrapped, nipper means acting on a continuous wrapper web in rear of the article to project the free end of said web and to position it on said article, adjustable tripping means for disengaging the nipper means from the web, means operative through movement of the article in the machine to draw the web towards and to wrap its free end about the article, and means to sever the folded wrapper from the web.

20. A wrapping machine comprising means to position in the machine an article to be wrapped, nipper means acting on a continuous wrapper web in rear of the article to project the free end of said web and to position it on said article, adjustable tripping means for disengaging the nipper means from the web, means operative through movement of the article in the machine to draw the web towards and to wrap its free end about the article, means to sever the folded wrapper from the web, brake means acting on said web in rear of said nipper means, and a connection between the severing means and said brake means.

21. A wrapping machine comprising plunger means to position in the machine an article to be wrapped, nipper means acting on a continuous wrapper web to position the free end thereof across said article, tripping means for disengaging the nipper means from the web, means to complete the folding of the web end about the article, including means to draw the web towards and to wrap its free end about the article, means to sever the wrapped package from the web, and means controlled by the plunger means to render said nipper means active.

22. A wrapping machine comprising means to position in the machine an article to be wrapped, cooperating wrapper web feeding and folding means constructed to wrap the article in the free end of a continuous wrapper web, means to sever the wrapped package from the web, and a swingable member having an arm adapted for contact with an article delivered to the machine and provided with means to control the initial feed of the wrapper web.

23. A wrapping machine comprising means to position in the machine an article to be wrapped, cooperating wrapper web feeding and folding means constructed to wrap the article in the free end of a continuous wrapper web, means to sever the folded wrapper from the web, and means controlled by the presence of an article in the machine to control the feed movement of the wrapper web, embracing a swingable member having an arm adapted for contact with an article delivered to the machine and provided with means to control the initial movement of the wrapper web, and a cam acting on the free end of said swinging member.

24. A wrapping machine comprising a support to receive an article to be wrapped, means to position the free end of a continuous wrapper web across said article, a transfer element adapted in one position to receive the article and the free end of the wrapper web, with means to force the article and free end of the web from the support to said transfer element, means to shift said transfer element in line with said runway, a plunger to force the partially wrapped article therefrom onto the runway, and means operative in the last named position of the transfer element to sever the folded wrapper from the web, to permit the severed margin of the wrapper to be folded between said article and runway in overlapping relation to the opposite free edge of the wrapper as the wrapped package is moving onto the runway.

25. A wrapping machine comprising a support to receive an article to be wrapped, means to position the free end of a continuous wrapper web across said article, a transfer element adapted in one position to receive the article and the free end of the wrapper web, with means to force the article from the support to said transfer element, means to move said transfer element in line with said runway, a plunger to force the partially wrapped article therefrom onto the runway, means operative in the last named position of the transfer element to sever the wrapped package from the web, to permit the severed margin of the wrapper to be folded between said article and runway in overlapping relation to the opposite free edge of the wrapper, gripper means for holding the wrapper against slipping on the article when the latter is forced from said support to said transfer element, and means acting to hold the wrapper against slipping on the article as the plunger ejects the wrapped article from said transfer element to said runway.

26. A wrapping machine comprising means to position the free end of a wrapper on and fold it about an article, a guide through which the web passes to guide the web in movement, and a severing knife operable on an unsupported taut portion of the web adjacent to said guide to sever the folded wrapper from the web.

27. A wrapping machine comprising mechanisms to wrap an article in the free end of a continuous wrapper web and to draw the web from a source of web supply, including means to press, and maintain pressure on, the free end of the web against the article during the wrapping operations, a web severing knife to sever the folded wrapper from the web as the wrapping is completed, and means between said source and knife operable to hold the web from withdrawal when said knife severs the web.

28. A wrapping machine comprising a support to receive the article to be wrapped, a discharge runway for the wrapped article, a transfer element to transfer an article and the free end of a wrapper web positioned thereon to said runway, a guide between said support and runway for a continuous wrapper web, co-operating feed and folding means to fold the article in the free end of the wrapper web, including means to discharge the wrapped article from said transfer element to said runway, and means to sever the folded wrapper from the web when the web is folded about the article and is taut and unsupported by supporting surfaces at its line of severance.

29. A wrapping machine comprising a support to receive an article to be wrapped, a discharge runway for the wrapped article, a transfer element, means to position the free end of a continuous wrapper across said article, operating means for the transfer element adapted to swing the receiving end of the transfer element from the level of said support to the level of said runway, means to feed the article with the free end of the wrapper on to the transfer element to partially fold the wrapper web thereabout, gripper means acting in opposition to the feed means to hold the wrapper from slipping on the article when fed to the transfer element, a plunger to feed the partially wrapped article from the transfer element to the runway, means acting to hold the wrapper from slipping on the article while passing from the transfer element to the runway, and means to sever the wrapper from the wrapper web as the wrapped article is passing onto the runway.

30. A wrapping machine comprising a support to receive the article to be wrapped, a discharge runway for the wrapped article, means to position the free end of a continuous wrapper across said article, a swinging transfer element having means to alternately bring its receiving end in line with the support and runway, means to feed the article with the free end of the wrapper web onto the transfer element to partially fold the web thereabout, gripper means acting in opposition to the feed means to hold the wrapper web from slipping on the article when so fed to the transfer element, means to sever the folded wrapper from the wrapper web, means to force the wrapped article from the transfer element to said runway friction means to restrain movement of the gripper means when the article is forced onto the transfer element, and means to restore said gripper means towards the receiving end of the transfer element.

31. A wrapping machine comprising a support to receive the article to be wrapped, a discharge runway for the wrapped article, means to position the free end of a continuous wrapper web across said article, a swinging transfer element having means to alternately bring its receiving end in line with said support and runway, means to feed the article with the free end of the wrapper web onto the transfer element to partially fold the wrapper web thereabout, gripper means acting in opposition to the feed means to hold the wrapper from slipping on the article, a plunger device to force the partially wrapped article from the transfer element onto the runway, means to sever the folded wrapper from the wrapper web, as the wrapped article is moving onto the runway friction means to restrain movement of the gripper means when the article is forced onto the transfer element, a cross member connecting said gripper means and a shoulder on the plunger device to move said gripper means towards the receiving end of the transfer element when the wrapped article is delivered to the runway.

32. A wrapping machine comprising a support to receive an article to be wrapped, a discharge runway, a swinging transfer element adapted in one position to be in line with said support and in another position to be in line with said runway, means to position the free end of a continuous wrapper web across said article, means to advance the article and the free end of the web onto said transfer element, a plunger device to force the web and article from the transfer element to said runway, a rotative drive shaft, a cam thereon to control the raising and lowering movement of the transfer element, operative connections between said cam and said plunger device and article advancing means, and means to sever the folded wrapper from the said wrapper web as it moves onto the runway.

33. A wrapping machine comprising a frame, a folding mechanism, a shelf arranged transversely in the frame, a fore and aft slide operative on said frame in rear of said shelf, a reciprocating plunger to feed articles onto said shelf, a lever operatively connected between said slide and plunger to reciprocate the latter from the former, means to position the free end of a continuous wrapper web across an article on said shelf, means operative to move the article through said folding mechanism to draw said web towards and wrap the article in its free end, and means to sever the folded wrapper from said web as it moves onto the runway.

34. A wrapping machine comprising a frame, a folding mechanism, a shelf disposed transversely across said frame to receive the article to be wrapped, a feed plunger to feed articles onto said shelf, a fore and aft operating slide in rear of said shelf, operative connections between said slide and plunger to operate the latter, means to position the free end of a continuous wrapper web across the article on the shelf, means operative to move the article through the folding mechanism to draw said web towards and wrap the article in its free end, means to sever the folded wrapper from the said web, an extension at the side of the frame in which said feed plunger reciprocates, and means arranged to deliver the articles successively to said extension into the path of said plunger.

35. A wrapping machine comprising a wrapping mechanism, means to position in the machine an article to be wrapped, means to position the free end of a continuous wrapper web across said article, means operative to move the article in the machine to feed the web toward and wrap the article in its free end, including means to hold the wrapper against the article in its movement through the wrapping mechanism to prevent the wrapper slipping thereon, web severing means adapted to sever the folded wrapper from the web, and web brake means operable simultaneously with said severing means and acting on said web during the web severing operation.

36. A wrapping machine comprising a wrapping mechanism, means to position in the machine an article to be wrapped, means to position the free end of a continuous wrapper web across said article, means operative to move the article in the machine to wrap the free end of the web about the article, a web cutting blade reciprocable towards and from the web, means to reciprocate said blade, a swinging brake dog adapted by gravity to press the web against a fixed abutment, and a link connected to said cutting blade and extending to and connected by a lost motion device to said brake dog.

37. A wrapping machine comprising a wrapping mechanism, means to position in the machine an article to be wrapped, means to position the free end of a continuous wrapper web across said article, means operative to move the article in the machine to wrap the free end of the web about the article, a web severing element adapted to sever the folded wrapper from the web, means to hold the wrapper against the article in its movement through the wrapping mechanism to prevent the wrapper web slipping thereon, web brake means operable by said severing element and acting on said web during the web severing operation, and a back stop acting on said wrapper web in rear of said severing element to prevent reverse feed movement of the said web.

38. In a bread wrapping machine for wrapping a loaf having a hollow bottom due to shrinkage, means for folding a wrapper about the loaf, with the margins overlapped on said hollow bottom, and a wrapper closing surface across which said wrapped loaf is passed, the face of which is curved to correspond to the hollow bottom of the loaf to engage and close the overlapped margins of the wrapper on said hollow bottom.

39. In a bread wrapping machine for wrapping a loaf having a hollow bottom due to shrinkage, means for folding a wrapper about the loaf with its margins overlapped on said hollow bottom, a runway through which the wrapped loaf is discharged, and a wrapper closing heat sealing element in said runway bottom, the closing face of which is curved to engage and close the overlapped wrapper margins at said hollow bottom, said runway also having a convex face to preliminarily iron the overlapped margins on said hollow bottom.

40. A wrapping machine comprising wrapping mechanism, including means to fold a wrapper sidewise about an article, with its margins extending beyond the ends of the article, hinged end flap forming and folding tuckers spring held towards each other, and means for spreading the tuckers as the partially wrapped article is forced therebetween, constructed to permit the tuckers to be spring pressed against and form and fold end flaps on the ends of the article.

41. A wrapping machine comprising a wrapping mechanism, including means to fold a wrapper sidewise about an article, with its margins extending beyond the ends of the article, and end flap forming and folding means embracing a pair of tuckers between which the partially wrapper article is moved in one direction to form and fold the first end flaps, a second pair of tuckers between which the partially wrapped article is moved in another direction to form and fold other end flaps on the wrapper, means for mounting said tuckers and for controlling them to separate both pairs of tuckers when a partially wrapped article is delivered therebetween, and spring means to force the tuckers together to force the end flaps against the ends of a package.

42. A wrapping machine comprising a wrapping mechanism, including means to fold a wrapper sidewise about an article, with its margins extending beyond the ends of the article, and end flap forming and folding means embracing tuckers between which the partially wrapped article is moved in one direction to form and fold the first end flaps, other tuckers between which the partially wrapped article is moved in another direction to form and fold other end flaps, pairs of swinging members extending towards each other from points of hinged supports on the machine and carrying on their adjacent ends said tuckers, said pairs of said members mutually interacting and being spring held towards each other, and means to control said members, constructed to spread them when a partially wrapped article is moved therebetween and to permit the tuckers to be spring pressed towards the ends of the article to form and fold the flaps thereon.

43. A wrapping machine comprising a wrapping mechanism, including means to fold a wrapper sidewise about an article, with its margins extending beyond the ends of the article, and end flap folding and forming means embracing tuckers between which the partially wrapped article is forced in one direction to form and fold the first end flaps on the package, other tuckers between which the partially wrapped article is forced in another direction to form and fold other end flaps on the package, pairs of members respectively carrying the first and second said tuckers and normally and mutually spring held towards each other, and means operative to spread said members apart as the article, in its passage through the wrapping mechanism, enters between said tuckers.

44. A wrapping machine comprising a wrapping mechanism, including means to fold a wrapper sidewise about an article, with its margins extending beyond the ends of the article, and end flap forming and folding means embracing tuckers between which the partially wrapped article is moved in one direction to form and fold the first end flaps, other tuckers between which the partially wrapped article is moved in another direction to form and fold other end flaps on the package, pairs of swinging members extending towards each other from points of hinged supports on the machine and carrying on their adjacent ends said tuckers, said pairs of said members mutually interacting and being spring held towards each other, and means to control said members, constructed to spread them when a partially wrapped article is forced between said tuckers and to permit the tuckers to be spring pressed towards the ends of the article to form and fold the flaps thereon.

45. A wrapping machine comprising a wrapping mechanism, including means to fold a wrapper sidewise about an article, with its margins extending beyond the ends of the article, and end flap forming and folding means embracing tuckers between which the partially wrapped article is forced in one direction to form and fold the first end flaps, other tuckers between which the partially wrapped article is forced in another direction to form and fold other end flaps, pairs of hinged members extending towards each other from points of hinged mounting and connected at their adjacent ends to move together, and on the adjacent ends of which members said tuckers are carried, spring means acting on one pair of said members to press the members of both pairs towards each other, and means to spread the members of the pairs away from each other.

46. A wrapping machine comprising a wrapping mechanism, including side folding mechanisms to fold a wrapper sidewise about an article, with the margins extending beyond the ends of the article, said folding mechanisms including means to change the direction of movement of the article during its side wrapping, opposing tuckers to engage the extended margins of the package to form and fold end flaps against the ends of the wrapper, other opposing tuckers to likewise form and fold other end flaps against the ends of the package, said tuckers being normally spring held towards each other, and means operably connected to the side folding mechanism to spread apart said tuckers against the action of their spring.

47. A wrapping machine comprising means to position in the machine an article to be wrapped, means to position the free end of a continuous wrapper web on and fold it sidewise about the article, and two sets of end flap folding tuckers mounted on members that extend towards and overlap each other and are hinged at their ends remote from the tuckers, and spring means acting on one pair of said members to yieldingly iron the tuckers against said end flaps.

48. A wrapping machine comprising an article receiving support, a runway, a pivoted transfer element, with its free end swingable between said support and runway, means to operate said transfer element, means movable in one direction to force an article and wrapper from said support to said transfer element and means movable in another direction to eject a wrapped article from said transfer element to said runway when said transfer element is in line with the runway, both said transfer element and said runway having end flap tuckers.

49. A wrapping machine comprising an article receiving support, a runway for wrapped articles, a swingable transfer element with its free end swingable between said shelf and runway, means to operate said transfer element, means to deliver an article and wrapper from said support to said transfer element, plunger means to eject a partly wrapped article from said transfer element to said runway when said transfer is in line with the runway, end flap forming and folding tuckers carried by and disposed longitudinally of said transfer element, and other end flap forming and folding tuckers carried by the machine frame adjacent to and above the plane of the receiving end of said runway, said latter tuckers being disposed vertically, and the first tuckers being disposed at their free ends in overlapping relation to said vertical tuckers.

50. A wrapping machine comprising means for causing the free end of the web to lie freely in the path of an article to be wrapped, means coacting with said free end and the article to press said end on and to wrap the article within said free end, and means to sever the wrapped article from the web while the web is pressure-held on the article.

51. In a wrapping machine, mechanism for positioning the free unattached end of a web on and for wrapping an article within said free end, including pressure means to hold said web taut about the article, and means to sever the wrapper from the web while the web is so held taut about said article.

52. A wrapping machine comprising means for causing the free, unattached end, of a web to lie freely in the path of an article to be wrapped, means coacting with the article and web to cause wrapping surfaces to hold the web and article engaged and the article to be wrapped within said free end of the web, and means to sever the wrapper from the web as the wrapping is being completed.

53. A wrapping machine comprising coacting article wrapping and web-feeding mechanisms to advance a continuous web to cause its free end to lie in the path of an article and to move the article, together with web end by pressure traction into the wrapping mechanism to thereby wrap the article within said free end of the web, and means to sever the folded wrapper from the web.

54. A wrapping machine comprising coacting article wrapping and web-feeding mechanisms to cause an article and the free end of a continuous web to be assembled and to be advanced into the wrapping mechanism, together with means to engage the free end of said web against the article and to draw the web along all sides of, and to wrap it taut about, the article, and means to sever the wrapper from the web while so taut about the article.

55. A wrapping machine adapted to wrap articles of irregular contour and circumferential dimensions in the free end of a web comprising pressure means to engage an article with the unattached free end of the web to draw said web on and to wrap the article within said free end and means to sever the wrapper from the web.

56. A wrapping machine for wrapping an article in the free end of a web, comprising means to engage an article with the unattached free end of the web and to wrap it within said free end, and means to sever the wrapper from the web while the web is held taut upon the sides of the article to prevent subsequent slackening of the wrapper on the article.

57. In a wrapping machine for wrapping an article in the free end of a nonadhesive web, mechanism to assemble the free end of said web and to wrap the article in said free end, including means to nonadhesively engage the web with the article and means to sever the wrapper from said web.

58. In a machine for wrapping an article in the free end of a web, wrapping mechanism through which the article and the web end are caused to be moved, together with pressure means coacting with the article and web to cause the wrapping movements of the article to draw the web on and wrap the article in it, and means to sever the wrapper from the web.

59. In a wrapping machine, means to position in the machine an article to be wrapped in the free end of a continuous web, adjustably controlled means to engage the web to advance its free end in variable lengths across the path of the article, and means to advance the article together with said free end into and through the wrapping mechanism to wrap the article in said free end.

60. In a wrapping machine, means to position in the machine an article to be wrapped in the free end of a continuous web, adjustably controlled means to engage the web to advance its free end in variable lengths across the path of the article, means to advance the article together with said free end into and through the wrapping mechanism to wrap the article in said free end, means to sever the wrapper from the web, and brake means operating in timed relation to the severing period to arrest feed movement of web during the severing operation.

61. A wrapping machine for circumferentially and end wrapping articles, comprising means to circumferentially wrap the article in the free end of a continuous web, means to form and fold end flaps of the web against the ends of the article and means to sever the wrapped article from the web.

62. A wrapping machine for circumferentially and end wrapping articles, comprising mechanism to circumferentially wrap the article in the free end of a continuous web, said mechanism including end flap forming and folding means positioned and operative to form and fold some of the end flaps against the end of the article during circumferential wrapping, and means to sever the wrapped article from the web.

In witness whereof I claim the foregoing as my invention, I hereunto append my signature this 28th day of February, 1922.

HARRY Y. ARMSTRONG.